United States Patent
An

(10) Patent No.: US 10,726,762 B2
(45) Date of Patent: Jul. 28, 2020

(54) FLEXIBLE DISPLAY DEVICE AND DISPLAYING METHOD OF FLEXIBLE DISPLAY DEVICE

(71) Applicant: Samsung Electronics Co., Ltd., Suwon-si, Gyeonggi-do (KR)

(72) Inventor: Jin-wang An, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 15/574,376

(22) PCT Filed: May 13, 2016

(86) PCT No.: PCT/KR2016/005076
§ 371 (c)(1),
(2) Date: Nov. 15, 2017

(87) PCT Pub. No.: WO2016/190579
PCT Pub. Date: Dec. 1, 2016

(65) Prior Publication Data
US 2018/0137801 A1    May 17, 2018

(30) Foreign Application Priority Data
May 27, 2015  (KR) .................. 10-2015-0073924

(51) Int. Cl.
*G09G 3/20* (2006.01)
*G06F 3/0484* (2013.01)
*G06F 1/16* (2006.01)
*G06F 3/01* (2006.01)
*G06T 3/00* (2006.01)
*G06T 5/00* (2006.01)

(52) U.S. Cl.
CPC ........... *G09G 3/2092* (2013.01); *G06F 1/163* (2013.01); *G06F 1/1652* (2013.01); *G06F 3/013* (2013.01); *G06F 3/0484* (2013.01); *G06T 3/0093* (2013.01); *G06T 5/006* (2013.01); *G09G 2354/00* (2013.01); *G09G 2380/02* (2013.01)

(58) Field of Classification Search
None
See application file for complete search history.

(56) References Cited

U.S. PATENT DOCUMENTS

| 7,519,920 | B2 | 4/2009 | Jarrett et al. |
| 8,928,619 | B1 * | 1/2015 | Cho ............... G06F 1/1652 345/173 |
| 9,785,232 | B2 | 10/2017 | Cha et al. |
| 2005/0175218 | A1 | 8/2005 | Vertegaal et al. |
| 2009/0243963 | A1 * | 10/2009 | Hotta .............. G02B 27/0093 345/7 |

(Continued)

FOREIGN PATENT DOCUMENTS

| KR | 20140075859 A | 6/2014 |
| WO | 2013058456 A2 | 4/2013 |

Primary Examiner — YuJang Tswei
(74) Attorney, Agent, or Firm — Jefferson IP Law, LLP

(57) ABSTRACT

Provided are a flexible display device including a flexible display, a sensor which obtains user gaze information, and a processor which determines an activated region on the flexible display based on the user gaze information and curvature information regarding the flexible display and controls content to be displayed in the determined activated region.

11 Claims, 22 Drawing Sheets

(56) References Cited

U.S. PATENT DOCUMENTS

| | | | |
|---|---|---|---|
| 2011/0213664 A1* | 9/2011 | Osterhout | G02B 27/017 |
| | | | 705/14.58 |
| 2012/0235893 A1 | 9/2012 | Phillips et al. | |
| 2013/0127980 A1* | 5/2013 | Haddick | G06F 3/013 |
| | | | 348/14.08 |
| 2014/0049452 A1 | 2/2014 | Maltz | |
| 2015/0091796 A1 | 4/2015 | Kwon et al. | |
| 2015/0146386 A1* | 5/2015 | Namkung | H05K 1/028 |
| | | | 361/749 |
| 2015/0234508 A1* | 8/2015 | Cho | G06F 3/0412 |
| | | | 345/173 |
| 2016/0341997 A1* | 11/2016 | Fukushima | H01L 51/105 |

\* cited by examiner 2000-1

DISTANCE FROM USER >
FIRST CRITICAL DISTANCE 2000-2

DISTANCE FROM USER <
FIRST CRITICAL DISTANCE
DISTANCE FROM USER >
SECOND CRITICAL DISTANCE 2000-3

DISTANCE FROM USER <
SECOND CRITICAL DISTANCE

FLEXIBLE DISPLAY DEVICE AND DISPLAYING METHOD OF FLEXIBLE DISPLAY DEVICE

TECHNICAL FIELD

The present disclosure relates to a flexible display device including a flexible display, and a displaying method of the flexible display device.

BACKGROUND ART

Along with the development of display technologies, a flexible display and a transparent display are being developed. A flexible display refers to a display device that may be bent.

A flexible display is provided with flexibility to be folded and unfolded by replacing a glass substrate surrounding liquid crystals in an LCD and an organic light-emitting diode (OLED) in the prior art with a plastic film Since a flexible display employs a plastic substrate instead of a common glass substrate, a low-temperature manufacturing process is used instead of a conventional manufacturing process in order to prevent damage to a substrate.

A flexible display is not only thin and lightweight, but also highly resistant to shock. Furthermore, a flexible display may be bent or curved and may be manufactured to have various forms. In particular, a flexible display may be applied to industrial fields to which a conventional glass substrate-based display may be limitedly applied or may not be applied.

For example, a flexible display may be applied to a new portable IT product, such as an e-book that may replace paper publications like magazines, textbooks, books, and comics, a micro PC that may be carried, folded, or rolled, a smart card capable of real-time information checking, etc. Furthermore, since a flexible display employs a flexible plastic substrate, a flexible display may be applied to wearable fashion clothing and medical diagnostics.

DETAILED DESCRIPTION OF THE PRESENT DISCLOSURE

Technical Problem

As a flexible display is commercialized, a displaying method in consideration of a visible range of a user according to a bending or folding property of the flexible display is demanded.

Technical Solution

Embodiments of the present disclosure provide a flexible display device which may include a flexible display; a sensor which obtains user gaze information; and a processor which determines an activated region on the flexible display based on the user gaze information and curvature information regarding the flexible display and controls content to be displayed in the determined activated region.

BEST MODE

Figure 1:
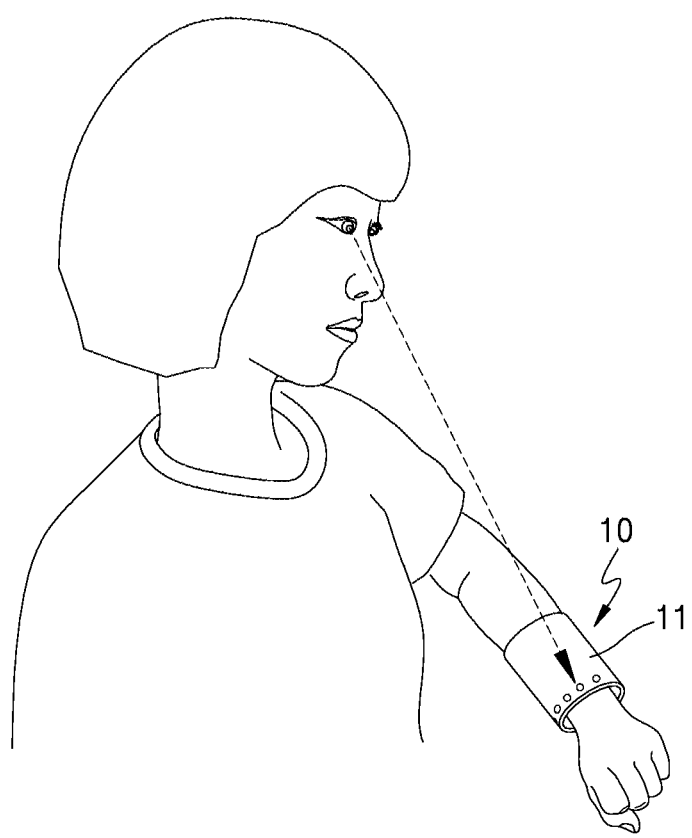
FIG. 1 is a schematic diagram showing a displaying method of a flexible display device, according to an exemplary embodiment.

The representative technical configuration of the present disclosure for accomplishing the object is as follows.

According to an aspect of the present disclosure, a flexible display device may include a flexible display; a sensor which obtains user gaze information; and a processor which determines an activated region on the flexible display based on the user gaze information and curvature information regarding the flexible display and controls content to be displayed in the determined activated region.

Furthermore, the processor may extract a gazing point of the user based on the user gaze information, determine the activated region based on the gazing point, and, when a curvature in the activated region is greater than a critical curvature, adjust the activated region.

Furthermore, the processor may generate content with image distortion corrected by adjusting an arrangement of pixels corresponding to the activated region based on the user gaze information and the curvature information.

Furthermore, as the user gaze information obtained by the sensor changes, the processor may control the activated region on the flexible display so as to be dynamically changed.

Furthermore, the sensor may obtain distance information regarding a distance from the flexible display device to a pupil of the user.

Furthermore, the processor may control an arrangement, an appearance, and a number of at least one object included in content, based on the distance information obtained by the sensor.

Furthermore, when the content includes a plurality of objects, as the distance information obtained by the sensor changes, the processor may change at least one of an arrangement, an appearance, or a number of the plurality of objects.

Furthermore, when the content includes one object, as the distance information obtained by the sensor is changed, the processor may change an appearance of the one object.

Furthermore, the sensor may include a plurality of gaze-detecting sensors arranged at a predetermined interval to obtain the user gaze information.

According to another aspect of the present disclosure, a flexible display device may include a flexible display; a communication interface which receives a notification message; a sensor which obtains user gaze information as the notification message is received; and a processor which determines an activated region on the flexible display based on the user gaze information and curvature information regarding the flexible display and controls the notification message to be displayed in the determined activated region.

According to another aspect of the present disclosure, a method by which a flexible display device displays content may include obtaining user gaze information; determining an activated region on a display screen of the flexible display based on the user gaze information and curvature information regarding the flexible display; and controlling content to be displayed in the determined activated region.

Furthermore, the determining of the activated region may include extracting a gazing point of the user based on the user gaze information; determining the activated region based on the gazing point; and, when a curvature in the activated region is greater than a critical curvature, adjusting the activated region.

Furthermore, the determining of the activated region may include generating content with corrected image distortion by adjusting an arrangement of pixels corresponding to the activated region based on the user gaze information and the curvature information.

Furthermore, the method may further include, when the user gaze information changes, controlling the activated region so as to be dynamically changed.

Furthermore, the method may further include obtaining distance information regarding a distance from the flexible display device to a pupil of the user.

Furthermore, the method may further include controlling an arrangement, an appearance, or a number of at least one object included in content, based on the distance information obtained by the sensor.

Furthermore, in the controlling of the at least one object included in the content, when the content includes a plurality of objects, as obtained distance information changes, at least one of an arrangement, an appearance, or a number of the plurality of objects may be changed.

Furthermore, in the controlling of the at least one object included in the content, when the content includes one object, as the obtained distance information changes, an appearance of the one object may be changed.

According to another aspect of the present disclosure, a method by which a flexible display device displays content may include receiving a notification message; obtaining user gaze information as the notification message is received; determining an activated region on the flexible display based on the user gaze information and curvature information regarding the flexible display; and controlling the notification message to be displayed in the determined activated region.

According to another aspect of the present disclosure, there is provided a computer-readable recording medium having recorded thereon a computer program for implementing the method by which a flexible display device displays content.

MODE OF THE PRESENT DISCLOSURE

The terms used in the present specification will be briefly described, and the present disclosure will be described in detail.

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of a new technology, and the like. In addition, in certain cases, a term which is not commonly used may be selected. In such a case, the meaning of the term will be described in detail at the corresponding part in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Throughout the present specification, the term 'content' refers to digital information provided via a wired/wireless communication network. Content according to an embodiment may include, but is not limited to, at least one of moving picture content, still picture content (e.g., a photograph, a drawing, etc.), text content (e.g., a newspaper article, a letter, a web page, etc.), music content (e.g., a music, a musical piece, a radio broadcast, etc.).

While the present disclosure has been described in connection with what is presently considered to be the most practical and preferred embodiment, it is to be understood that the present disclosure is not limited to the disclosed embodiments. In order to clearly illustrate the present disclosure, elements not related to the description are omitted, and like elements are denoted by like reference numerals throughout the specification.

FIG. 1 is a schematic diagram showing a displaying method of a flexible display device according to an embodiment.

Referring to FIG. 1, a flexible display device 10 may be implemented as devices for various purposes. For example, the flexible display device 10 according to an embodiment may be implemented as a mobile phone, a smart phone, a laptop computer, a tablet device, an e-book device, a smart TV, a digital broadcasting device, a personal digital assistant (PDA), a portable multimedia player (PMP), a navigation device, a head-up display device for a vehicle, and an advertisement display device. Furthermore, the flexible display device 10 described herein may be a wearable device. For example, the flexible display device 10 according to an embodiment may be a wristwatch, a ring, a bracelet, an ankle bracelet, etc.

The flexible display device 10 employs a flexible display 11. The flexible display 11 may include various types of display devices that may be deformed by external force, e.g., a foldable display that may be folded or unfolded at a specific angle or a specific curvature, a bendable display that may be bent or un-bent at a particular curvature, a rollable display that may be rolled to a cylindrical shape, etc.

Like conventional display devices including a liquid crystal display (LCD) and a light emitting diode (LED) display, the flexible display 11 may provide content generated in the flexible display device 10. In other words, the flexible display 11 may display a notification message, an alarm message, an application program execution screen, etc.

Meanwhile, as shown in FIG. 1, when the flexible display device 10 is implemented as a wristband that may be worn on a user's wrist, the user may see only one surface of the flexible display 11 while the user is wearing the wristband. Therefore, displaying content across the entirety of the flexible display 11 may not only deteriorate readability of the user, but also waste power.

Therefore, according to an embodiment, the flexible display device 10 may obtain user gaze information regarding gaze of a user through gaze detecting sensors arranged at a predetermined interval in the flexible display 11. The gaze detecting sensors may include, for example, cameras, infrared LEDs (IR LEDs), or IR cameras capable of recognizing a user's pupil. Furthermore, the gaze information may include user pupil recognition information, information regarding a gaze direction, etc.

According to an embodiment, based on obtained user gaze information and a degree that the flexible display device 10 is bent, the flexible display device 10 may set a region of the flexible display 11 viewed by the eyes of a user as an activated region and set the remaining region of the flexible display 11 as a non-activated region. Here, the activated region may be a region in which content is displayed. On the contrary, the non-activated region may be the remaining region of the flexible display 11 in which content is not displayed.

The flexible display device 10 may also obtain distance information regarding a distance from a user to the flexible display 11. The flexible display device 10 may control at least one of an arrangement of objects included in content, appearances of the objects, and the number of the objects by using the obtained distance information. Therefore, a user located at a remote location from the flexible display device 10 and a user located at a nearby location from the flexible display device 10 may receive different information.

As described above, the flexible display device 10 according to an embodiment may efficiently provide contents to a user with minimum power consumption.

Figure 2:
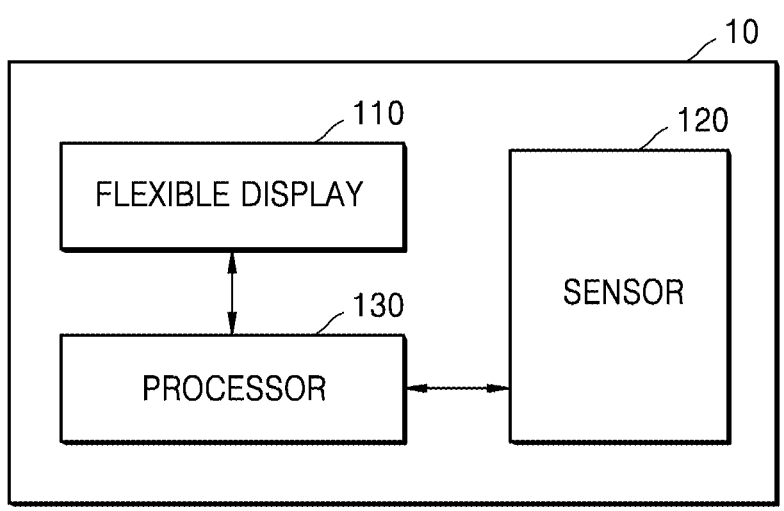
FIG. 2 is a block diagram showing hardware components of a flexible display device according to an exemplary embodiment.

FIG. 2 is a block diagram showing hardware components of a flexible display device according to an embodiment.

Referring to FIG. 2, the flexible display device 10 may include a flexible display 110, a sensor 120, and a processor 130. Only hardware components related to an embodiment will be described with reference to FIG. 2. However, it should be understood by one of ordinary skill in the art that general hardware components other than the hardware components shown in FIG. 2 may also be included.

The flexible display 110 is a hardware component for displaying information processed in the flexible display device 10. The flexible display device 10 may provide content to a user through the flexible display 110. Furthermore, the flexible display device 10 may provide a graphical user interface (GUI) screen to the user through the flexible display 110.

Meanwhile, the flexible display 110 according to an embodiment may be one of various types of displays that may be deformed by external force as described above, e.g., a foldable display, a bendable display, a rollable display, etc.

According to an embodiment, the sensor 120 may sense deformation state of the flexible display device 10 or the flexible display 110. At this time, the deformation state may indicate a state in which the external shape of the flexible display device 10 is changed (e.g, folded, bent, etc.). The sensor 120 may include a plurality of deformation state detecting sensors for sensing a deformation state of the flexible display device 10 or the flexible display 110. The deformation state detecting sensor may be, for example, a flex sensor (or a bending sensor) for detecting a deformation state based on a resistance value that varies according to a degree of bending.

The sensor 120 may detect a curvature in a deformation state of the flexible display device 10 or the flexible display 110 (hereinafter, a curvature in the deformation state will be referred to as "deformation curvature"). Alternatively, the sensor 120 may sense a degree of folding or rolling of the flexible display device 10 or the flexible display 110 in a deformation state, depending on a type of flexible display in the flexible display device 10 or the flexible display 110. Accordingly, the sensor 120 may detect various deformation states corresponding to types of a flexible display.

According to an embodiment, the sensor 120 may obtain information regarding a deformation location (a coordinate value, a deformation line, etc.), a deformation direction, a deformation angle, a deformation curvature, a deformation intensity, a number of deformations, etc.

It should be understood by one of ordinary skill in the art that the deformation state detecting sensor may be implemented integrally with the flexible display 110 according to embodiments.

According to an embodiment, the sensor 120 may obtain user gaze information regarding a user of the flexible display device 10. At this time, the user gaze information may include user pupil recognition information, information regarding a gaze direction, etc. The sensor 120 may include a plurality of gaze detecting sensors arranged at a predetermined interval on a front surface or a side surface of the flexible display device 10. The gaze detecting sensors may include, for example, cameras, IR LEDs, IR cameras, etc. The sensor 120 may track a user's pupil when the user's pupil is detected through at least one of the plurality of gaze detecting sensors. Furthermore, the sensor 120 may obtain direction information regarding gaze of the user from the gaze detecting sensor in which the user's pupil is detected. Furthermore, the sensor 120 may obtain distance information regarding a distance from the pupil of the user to the flexible display 110.

According to an embodiment, when a notification message is received from a communication interface (330 of FIG. 3), the sensorsensor 120 may activate the deformation state detecting sensors and the gaze detecting sensors, which were in a deactivated state, thereby obtaining information regarding a deformation state and user gaze information. Alternatively, the sensor 120 may obtain information regarding a deformation state and user gaze information by activating the deformation state detecting sensors and the gaze detecting sensors at predetermined time intervals.

Furthermore, the sensor 120 may provide obtained various information to the processor 130.

According to an embodiment, the processor 130 may determine an activated region based on information regarding a deformation state of the flexible display device 10 (or the flexible display 110) and user gaze information provided from the sensor 120.

According to an embodiment, the processor 130 may extract a gazing point of a user on the flexible display 110 based on the user gaze information. The processor 130 may determine an activated region for displaying content based on the extracted gazing point.

According to an embodiment, the processor 130 may determine whether an activated region includes a deformation curvature equal to or greater than a critical value based on information regarding a deformation state of the flexible display device 10 provided from the sensor 120. When a curvature equal to or greater than the critical value exists in the activated region, the processor 130 may reduce the activated region to a region not including a curvature equal to or greater than the critical value, by taking a deformation location and a deformation direction around a gazing point into account.

Alternatively, the processor 130 may determine a viewing angle of a user based on information regarding a distance to the user to the flexible display device 10 and information regarding a deformation state of the flexible display device 10. The viewing angle may refer to an angle or a range at which a user may recognize an object without moving the head or a pupil. The processor 130 may reduce a size of an activated region to a size within a viewing angle of a user when a determined activated region includes a region outside the viewing angle of the user.

According to an embodiment, the processor 130 may control the flexible display 110 to display content in an activated region. The content may include, for example, a notification message, an application program execution screen, etc.

Furthermore, according to an embodiment, the processor 130 may adjust an arrangement of pixels to correct a display distortion caused by a deformation curvature within an activated region. For example, the processor 130 may adjust a ratio of pixels of the flexible display 110 assigned to pixels of the content.

Furthermore, the processor 130 may determine a factor for changing a visual effect corresponding to distance information regarding a distance from a user to the flexible display device 10. Here, a factor for changing a visual effect may refer to, for example, an arrangement, an appearance, or the number of at least one object to be included in content. Therefore, as the distance to the user to the flexible display device 10 varies, the processor 130 may generate content with at least one of an arrangement, an appearance, and the number of objects different from one another.

According to an embodiment, the processor 130 may be provided with dynamically changing information regarding the flexible display device 10 and/or dynamically changing gaze information of a user from the sensor 120. In this case, the processor 130 may dynamically change an activated region based on information provided from the sensor 120.

Meanwhile, the processor 130 is a hardware component implemented by at least one processor, such as a central processing unit (CPU) or an application processor (AP), and, in addition to the operations described above, may perform a function for controlling an overall operation of the flexible display device 10.

Figure 3:
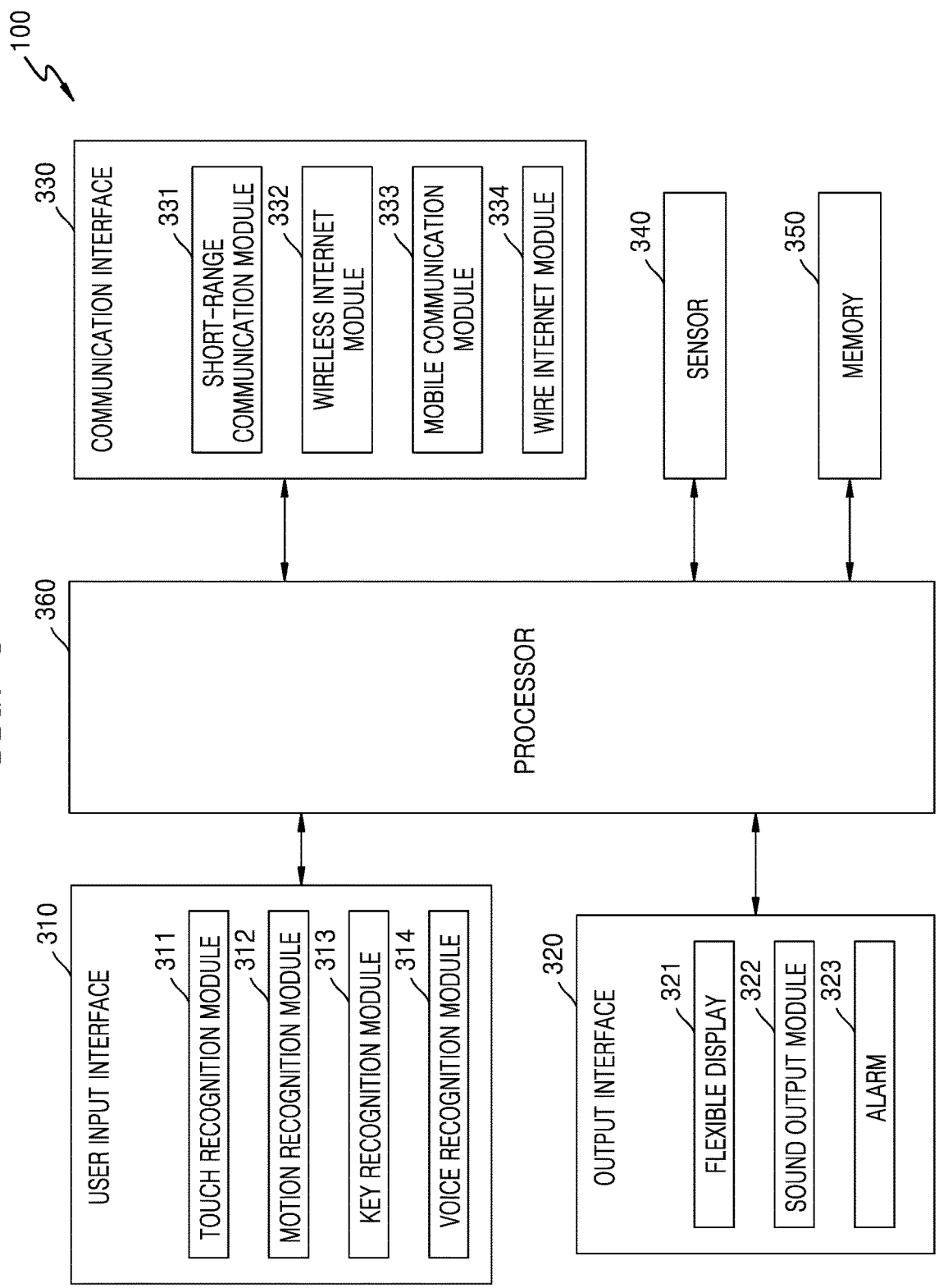
FIG. 3 is a block diagram showing in detail hardware components of a flexible display device according to an exemplary embodiment.

FIG. 3 is a block diagram showing hardware components of a flexible display device according to an embodiment in detail.

Referring to FIG. 3, a flexible display device 10 may include a user input interface 310, an output interface 320, a communication interface 330, a sensor 340, a memory 350, and a processor 360.

The user input interface 310 may include a touch recognition module 311, a motion recognition module 312, a key recognition module 313, and a voice recognition module 314, the output interface 320 may include a flexible display 321, a sound output module 322, and an alarm 323, and the communication interface 330 may include a short-range communication module 331, a wireless internet module 332, a mobile communication module 333, and a wire internet module 334. Only hardware components related to the present embodiment will be described with reference to FIG. 3 in order to prevent features of the present embodiment from being obscured. However, it will be understood by one of ordinary skill in the art that, depending on types of the flexible display device 10, general hardware components other than the hardware components shown in FIG. 3 may be further included or some of the hardware components shown in FIG. 3 may be omitted. Meanwhile, descriptions of the flexible display device 10 of FIG. 2 may be applied to the flexible display device 10 of FIG. 3 and the like.

The user input interface 310 may refer to a hardware component with which a user inputs information for controlling the flexible display device 10. For example, the user input interface 310 may be implemented with a key pad, a dome switch, a touch pad, a jog wheel, a jog switch, etc.

The touch recognition module 311 may sense a touch gesture or a touch input of a user and transmit information regarding the sensed touch gesture or touch input to the processor 360.

The touch recognition module 311 may include various sensors for sensing a touch or a proximity touch. In order to sense a touch gesture or a touch input, the touch recognition module 311 may be implemented as a contact capacitance type, a pressure resistive film type, an infrared ray detecting type, a surface ultrasonic wave conduction type, an integral tension measuring type, or a piezo effect type.

Furthermore, the touch recognition module 311 may detect a proximity touch by using a proximity sensor. The proximity sensor refers to a sensor that detects presence of an object approaching toward a predetermined detection surface or an object existing nearby the detection surface without a mechanical contact by using force of an electromagnetic field or an infrared ray. Examples of a proximity sensor includes a transmissive photoelectric sensor, a direct-reflective photoelectric sensor, a mirror-reflective photoelectric sensor, a high-frequency oscillating proximity sensor, a capacitive proximity sensor, a magnetic proximity sensor, an infrared proximity sensor, etc.

Meanwhile, a touch gesture or a touch input of a user may include a tap, a touch-and-hold, a double tap, a drag, a panning, a flick, a drag-and-drop, etc.

Furthermore, the touch recognition module 311 may be implemented as a touch screen by constituting a plurality of layers with the flexible display 321. In other words, the flexible display 110 described above with reference to FIG. 2 may be implemented as a hardware structure of a touch screen including the touch recognition module 311 and the flexible display 321 of FIG. 3.

The motion recognition module 312 may recognize a movement of the flexible display device 10 and transmit information regarding the movement of the flexible display device 10 to the processor 360. The motion recognition module 312 may recognize a movement, such as three-dimensional movement or a rotation, other instead of a deformation of the flexible display device 10.

The motion recognition module 312 may include various sensors for recognizing a movement of the flexible display device 10. For example, the motion recognition module 312 may include an acceleration sensor, a tilt sensor, a gyro sensor, a 3-axis magnetic sensor, etc.

Motion inputs that may be recognized by the motion recognition module 312 may include a three-dimensional motion input corresponding to a movement of the flexible display device 10 in directions along the X-axis, the Y-axis, and the Z-axis, a rotating motion input corresponding to a rotation of the flexible display device 10 in at least one direction in a 3-dimensional space, a shaking motion input in which the flexible display device 10 is shaken in at least one direction, a tilting motion input corresponding to an inclination of the flexible display device 10 in a predetermined direction, etc.

The key recognition module 313 may recognize a command input of a user input through a hardware key (e.g., a directional key, a character key, a mouse key, etc). The voice recognition module 314 may recognize a voice of a user by using a voice recognition engine and transmit the recognized voice to the processor 360.

The output interface 320 is a hardware component for outputting an audio signal, a video signal, or an alarm signal.

The flexible display 321 is a display for providing various information, such as information processed in the flexible display device 100 or information to be processed in the flexible display device 100, to a user. The flexible display 321 may display a graphical user interface (GUI) for visually and intuitively providing information processed in the flexible display device 100 to a user.

The sound output module 322 outputs audio data received via the communication interface 330 or stored in the memory 350. The sound output module 322 may include a speaker, a buzzer, etc.

The alarm 323 outputs a signal for notifying an occurrence of an event of the flexible display 321. The alarm 323 may output a signal for notifying an occurrence of an event via at least one of an audio signal, a video signal, and a vibration signal.

The communication interface 330 is a hardware component having a function for communicating with an external network or an external device.

According to an embodiment, the communication interface 330 may receive a short message service (SMS) message, a multimedia message service (MMS) message, a social network service (SNS) message, or a call notification from an external network or an external device.

The short-range communication module 331 is a module for a short-range communication and may employ a short-range communication protocol, such as Bluetooth, UWB, ZigBee, near field communication (NFC), Wi-Fi Direct (WFD), and infrared data association (IrDA).

The wireless internet module 332 is a module for accessing Internet wirelessly. The mobile communication module 333 is a module for communicating with a mobile communication network. The wire internet module 134 is a module for accessing Internet via a wire.

According to an embodiment, the sensor 340 may include a deformation state detecting sensor that obtains information regarding a deformation state of the flexible display device 100 (or the flexible display 321) and an gaze detecting sensor that obtains user gaze information. Meanwhile, the sensor 340 may correspond to the sensor 120 of FIG. 2.

According to an embodiment, the deformation state detecting sensor (not shown) may be a plurality of flex sensors (or bending sensors), IR sensors, pressure sensors, electromagnetic sensors, etc. The deformation state detecting sensor may obtain a deformation state of the flexible display device 100 by collecting and analyzing information regarding the deformation state by using at least one sensor. Here, the deformation state may include a folded state, a bent state, a rolled state, etc., as described above. In relation to a deformation state, the sensor 340 may obtain information regarding a deformation location (a coordinate value and a deformation line), a deformation direction, a deformation angle, a deformation curvature, deformation intensity, a deformation speed, the number of deformations, a time point at which a deformation has begun, and a time period during with a deforming activity may be maintained.

The gaze detecting sensor (not shown) may be a plurality of cameras, IR cameras, or IR LEDs. The gaze detecting sensor may obtain information regarding a gaze direction of a user by detecting a pupil of the user by using at least one sensor and analyzing a shape of the pupil. Furthermore, the gaze detecting sensor may detect a change of user gaze information by tracking a pupil of a user.

The memory 350 is a hardware component for storing information processed in the flexible display device 100 and may be implemented as a hard disk drive (HDD), a solid state drive (SDD), a random access memory (RAM), a read-only memory (ROM), etc. For example, the memory 350 may store general information regarding a graphical user interface screen to be displayed via the flexible display 110.

The processor 360 is a hardware component for controlling overall operations and functions of the flexible display device 100 and may be implemented with at least one processor, such as a CPU, an AP, a GPU, etc. The processor 130 of FIG. 2 described above may correspond to the processor 360.

Figure 4:
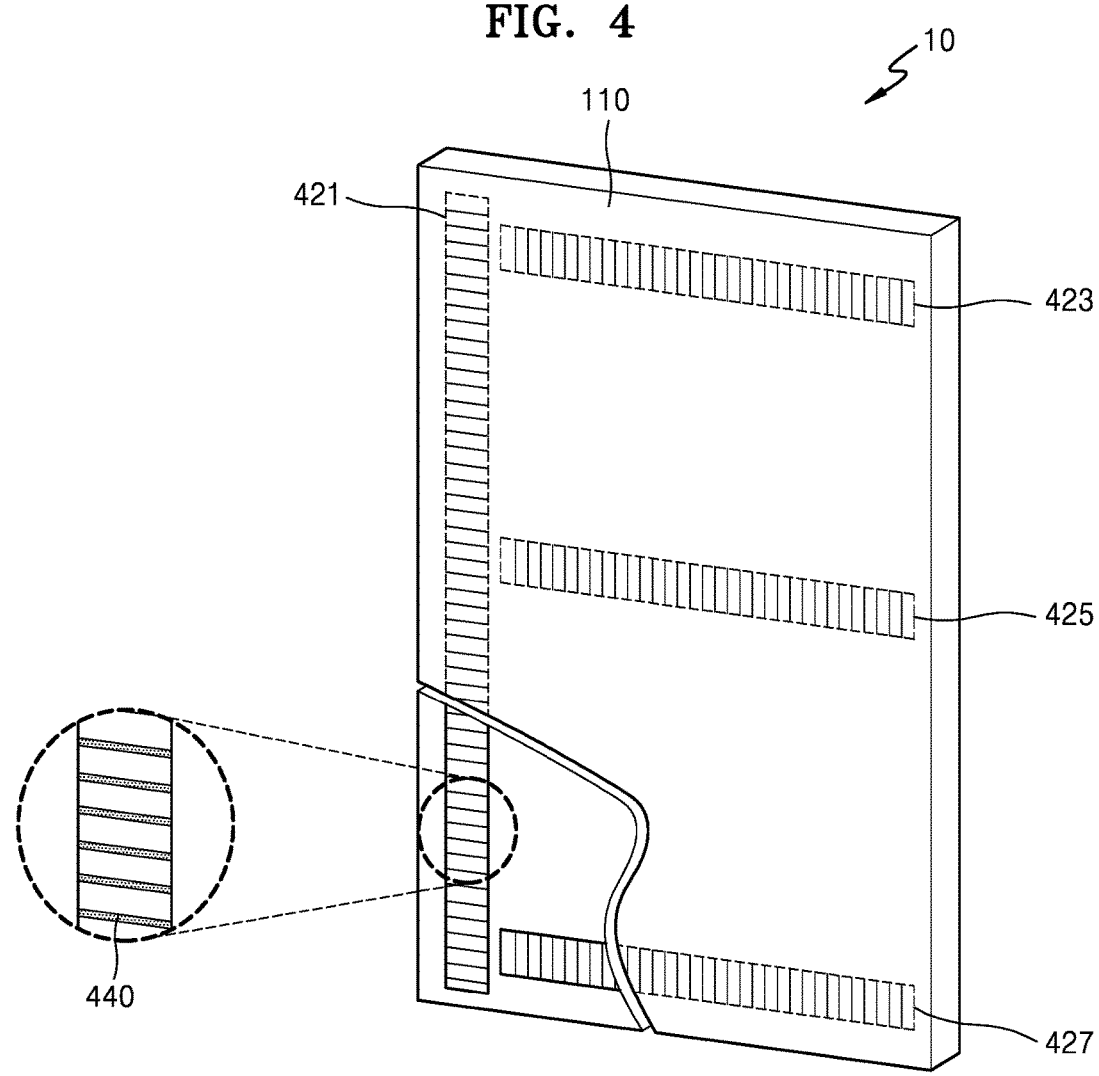
FIG. 4 is a diagram showing a method whereby a sensor senses a deformation state of a flexible display device 10, according to an exemplary embodiment.

FIG. 4 is a diagram showing a method whereby a sensor senses a deformation state of the flexible display device 10 in a sensor according to an embodiment.

Referring to FIG. 4, it is assumed that the flexible display 110 may be freely bent. According to an embodiment, the flexible display 110 may be implemented in combination with a plurality of flex sensors 421 through 427. Each of the flex sensors may sense whether the flexible display 110 is deformed, depending on whether measured resistance values vary. Furthermore, each of the flex sensors may include a plurality of sensing points 440 arranged at a predetermined interval. The sensor 120 may analyze changes of numbers collected by the sensing points 440 and obtain a deformation curvature.

Meanwhile, although it has been described above with reference to FIG. 4 that the flexible display device 10 includes four flex sensors, the present disclosure is not limited thereto. According to implementations of the flexible display device 10, the flexible display device 10 may include one of various numbers of flex sensors.

Furthermore, it will be understood by one of ordinary skill in the art that, according to implementations of the flexible display device 10, an angle of folding or a degree of rolling of the flexible display device 10 may be obtained via a sensor other than a flex sensor, e.g., an IR sensor, a pressure sensor, an electromagnetic sensor, etc.

Figure 5:
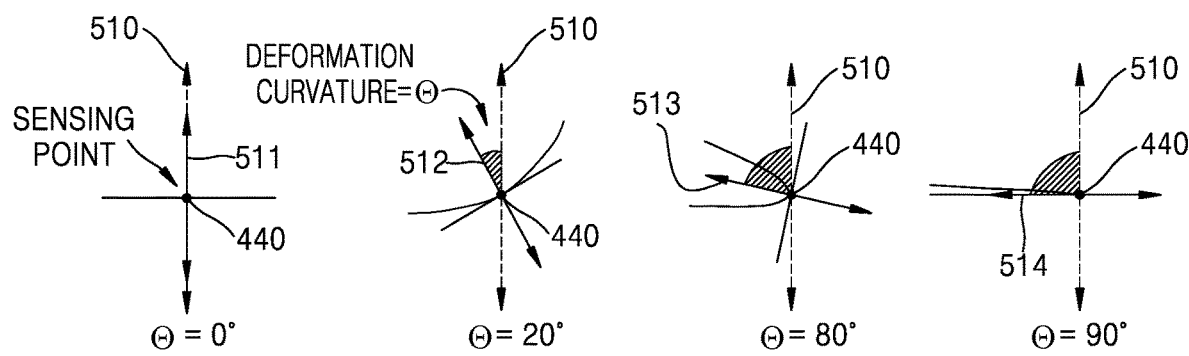
FIG. 5 is a diagram showing an example where a deformation curvature is obtained at a sensing point of a flex sensor.

FIG. 5 is a diagram showing an example that a deformation curvature is obtained at a sensing point of a flex sensor.

Referring to FIG. 5, a flex sensor may sense a deformation curvature (bending curvature) Θ at each sensing point 440. The deformation curvature Θ may be an angular difference between a line 510 perpendicular to a flex sensor when the flex sensor is not deformed and lines 511 through 514 perpendicular to the flex sensor after the flex sensor is deformed.

For example, a flex sensor may sense a deformation curvature Θ from +180 degrees to −180 degrees. Meanwhile, the sensor 120 may provide a detected deformation curvature to the processor 130.

Figure 6A:
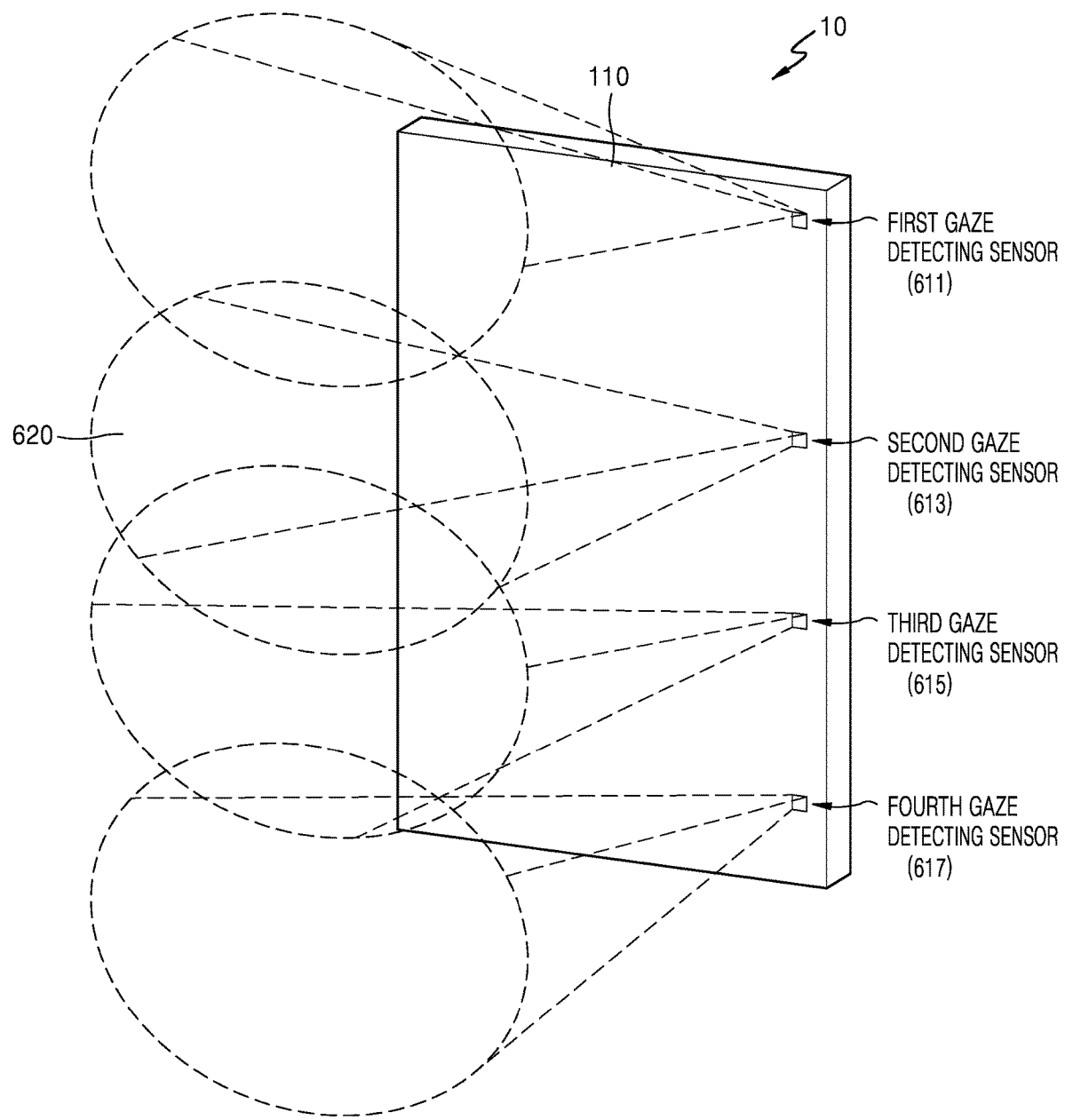
FIGS. 6A through 6C are diagrams for describing a method whereby a sensor obtains user gaze information regarding a user, according to an exemplary embodiment.
Figure 6B:
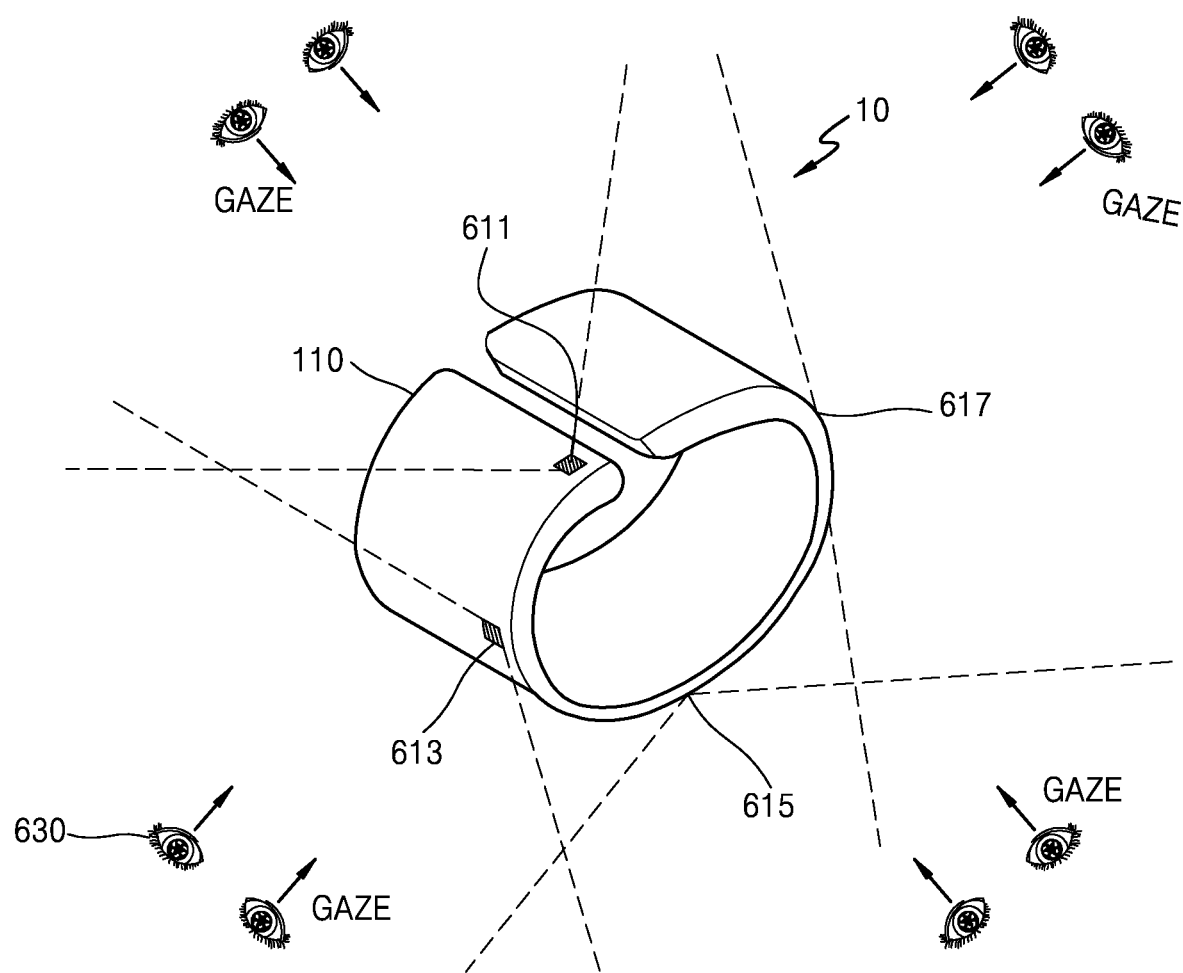
Figure 6C:
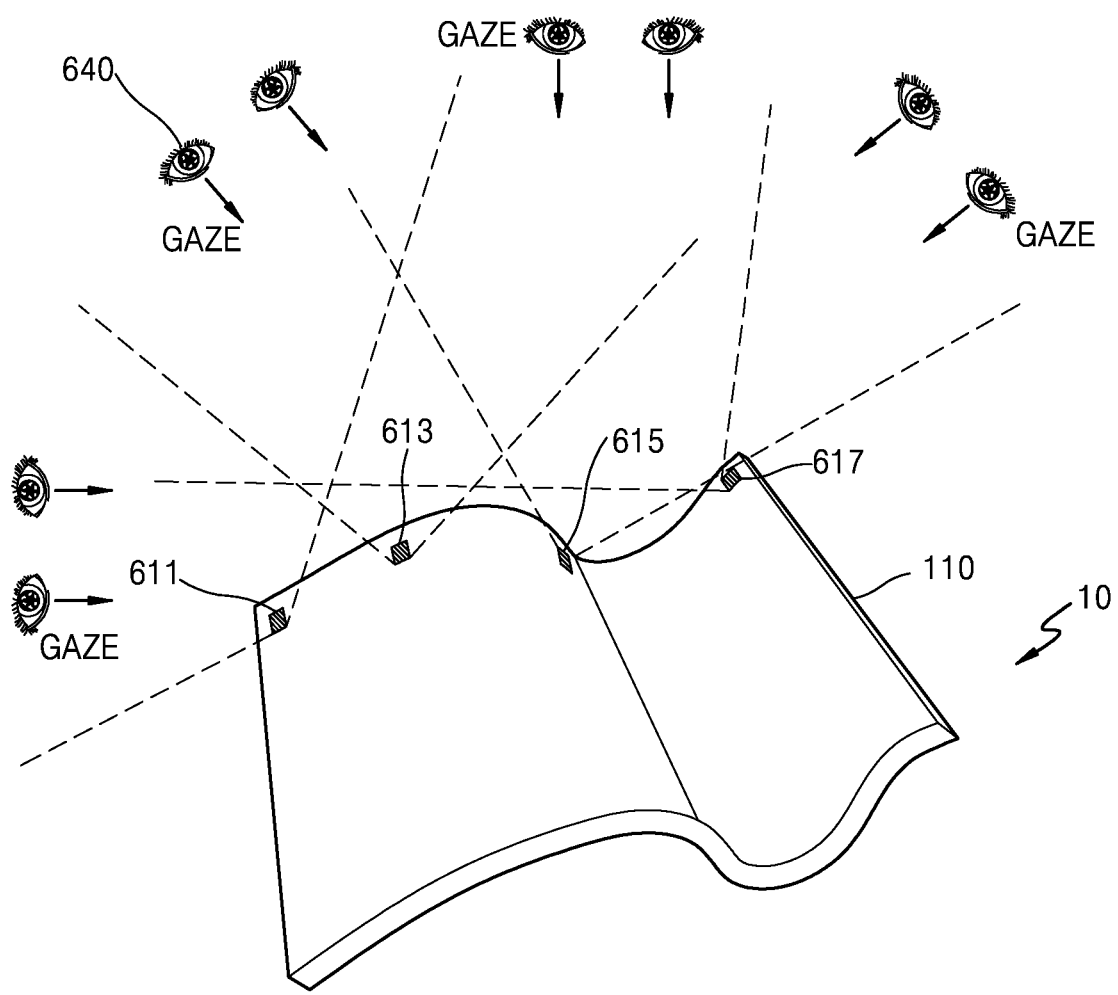

FIGS. 6A through 6C are diagrams for describing a method whereby a sensor obtains user gaze information regarding a user according to an embodiment.

Referring to FIG. 6A, the sensor 120 may include first through fourth gaze detecting sensors 611 through 617 arranged at a predetermined interval on a front surface (or a side surface) of the flexible display device 10 to detect a pupil of a user within a predetermined range 620. The first through fourth gaze detecting sensors 611 through 617 may be, for example, cameras, IR cameras, or IR LEDs.

According to an embodiment, an gaze detecting sensor may capture an image and detect a circular object from the captured image, thereby recognizing a pupil of a user. Furthermore, the gaze detecting sensor may obtain direction information regarding gaze of the user by tracking the recognized pupil.

Alternatively, the gaze detecting sensor may recognize a pupil of a user by emitting an infrared ray and detecting an infrared ray reflected from the pupil of the user. Furthermore, the gaze detecting sensor may obtain information regarding a gaze direction of the user by analyzing a direction in which the reflected infrared ray travels. Alternatively, when a pupil of a user is detected, the gaze detecting sensor may start capturing an image, thereby tracking the pupil of the user and obtaining direction information regarding gaze of the user.

In the flexible display device 10 according to the embodiment, even when the shape of the flexible display device 10 is deformed by an external force, the sensor 120 may detect a pupil of a user by using the first through fourth gaze detecting sensors 611 through 617 arranged at a predetermined interval.

For example, when the flexible display device 10 is deformed into a cylindrical shape as shown in FIG. 6B, the sensor 120 may detect a pupil of a user seeing the flexible display device 10 at various angles by using a plurality of gaze detecting sensors.

Alternatively, even when the flexible display device 10 is deformed into an arbitrary shape as shown in FIG. 6C, the sensor 120 may detect a pupil of a user seeing the flexible display device 10 by using the first through fourth gaze detecting sensors 611 through 617.

Meanwhile, according to an embodiment, the flexible display device 10 may switch remaining gaze detecting sensors other than a particular detecting sensor via which a pupil of a user is sensed, the remaining gaze detecting sensors to a deactivated state (or a turned-off state).

For example, as shown in FIG. 6B, when a user's pupil 630 is sensed by a second gaze detecting sensor 613, the flexible display device 10 may deactivate the remaining gaze detecting sensors 611, 615, and 617. Next, the sensor 120 may track the user's pupil 630 through the second gaze detecting sensor 613, which is in an activated state. When the user's pupil 630 is out of a range covered by the second gaze detecting sensor 613, the flexible display device 10 may switch a first gaze detecting sensor 611 or a third gaze detecting sensor 615 to an activated state (or a turned-on state) according to a moving direction of the user's pupil 630, thereby continuously tracking the user's pupil 630.

Alternatively, as shown in FIG. 6C, when the first, second, and fourth gaze detecting sensors 611, 613, and 617 sense a user's pupil 640 together, the flexible display device 10 may select one gaze detecting sensor for tracking the detected user's pupil 640. The flexible display device 10 may select, for example, the second gaze detecting sensor 613, which is closest to the user's pupil 640 from among the first, second, and fourth gaze detecting sensors 611, 613, and 617. The flexible display device 10 may switch the remaining gaze detecting sensors other than the selected second gaze detecting sensor 613 to the deactivated state.

Meanwhile, although it has been described above with reference to FIGS. 6A to 6C that the sensor 120 includes four gaze detecting sensors, the present disclosure is not limited thereto. It will be understood by one of ordinary skill in the art that the sensor 120 may include various numbers of gaze detecting sensors, depending on implementations and purposes of the flexible display device 10.

Figure 7:
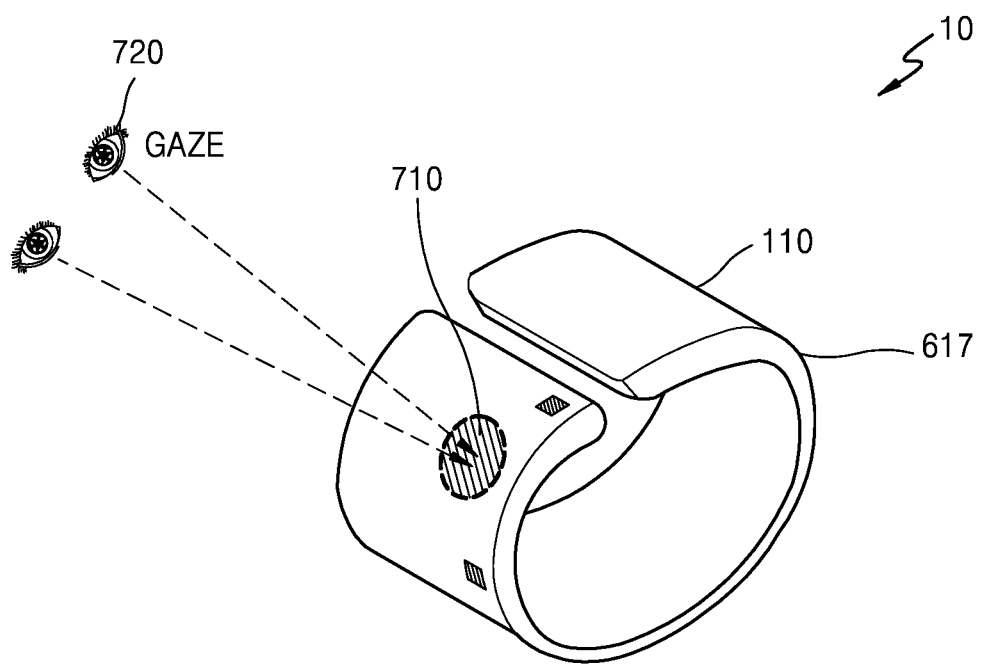
FIG. 7 is a diagram for describing a method whereby a processor extracts a gazing point of a user, according to an exemplary embodiment.

FIG. 7 is a diagram for describing a method whereby a processor extracts a gazing point of a user according to an embodiment.

Referring to FIG. 7, the processor 130 may extract a gazing point based on user gaze information provided from the sensor 120. Here, a gazing point 710 may be a certain region on the flexible display 110, the region gazed by a user with both eyes.

Figure 8A:
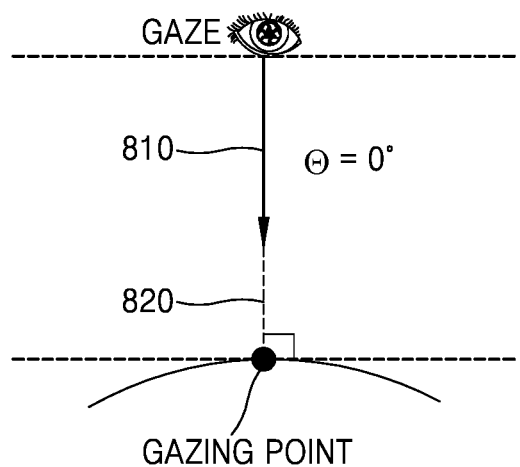
FIGS. 8A and 8B are diagrams showing examples of gaze directions of a user.
Figure 8B:
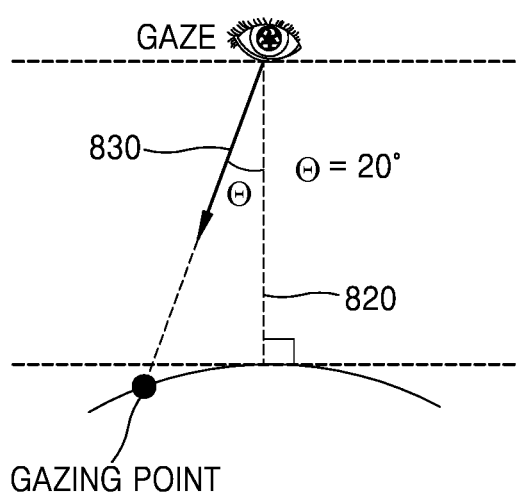

According to an embodiment, the processor 130 may extract the gazing point 710 by using information regarding a gaze direction of a user. At this time, the information regarding the gaze direction of the user may be expressed as an angle from −180 degrees to +180 degrees based on a straight line that passes through a pupil 720 of the user and is perpendicular to the flexible display 110 (that is, a perpendicular line). For example, since a gaze direction 810 of a user in FIG. 8A is identical to the direction of a perpendicular line 820, information regarding the gaze direction 810 in FIG. 8A has a value of "+0 degree", whereas information regarding a gaze direction 830 in FIG. 8B has a value of "−20 degrees". The processor 130 may extract a gazing point of the user based on information regarding a gaze direction of the user.

Figure 9A:
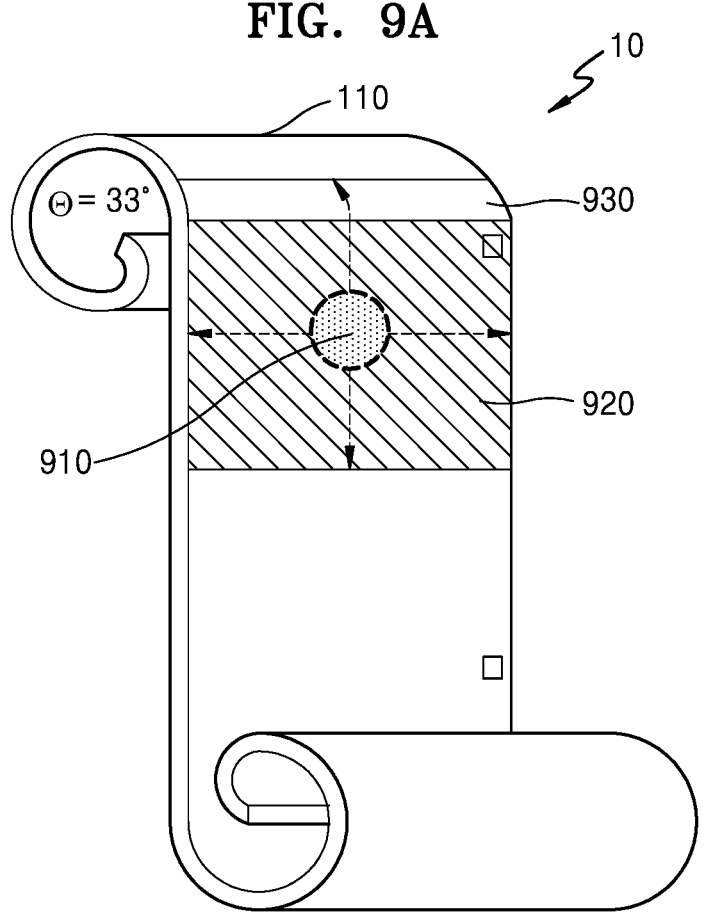
FIGS. 9A and 9B are diagrams for describing a method of determining an activated region, according to an exemplary embodiment.
Figure 9B:
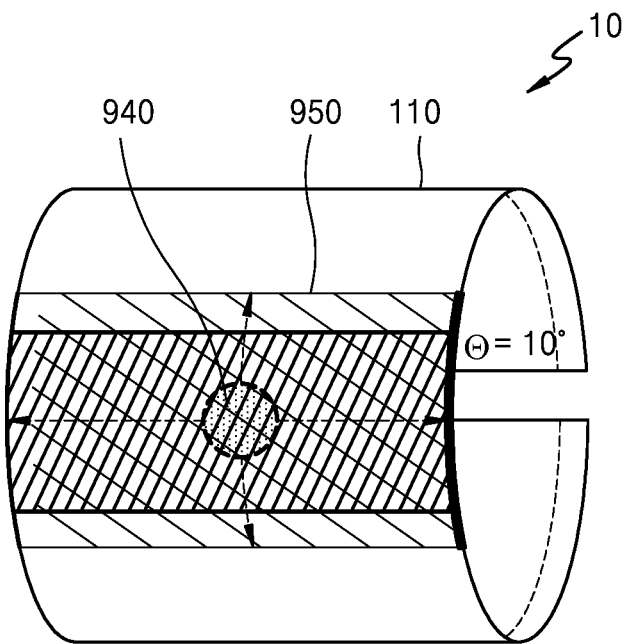

FIGS. 9A and 9B are diagrams for describing a method of determining an activated region according to an embodiment.

Referring to FIGS. 9A and 9B, the processor 130 may determine an activated region (hatched region) according to a gazing point, based on information regarding a deformation state of the flexible display device 10 provided from the sensor 120.

According to an embodiment, the processor 130 may determine an activated region to locations that are a predetermined distance apart from a gazing point 910 in four directions. At this time, the processor 130 may determine whether a deformation curvature equal to or greater than a critical curvature (e.g., 30 degrees) exists in the activated region 920 and adjust the activated region 920. For example, when a deformation curvature equal to or greater than a critical curvature exists in the activated region 920 as shown in FIG. 9A, the processor 130 may adjust the activated region 920 to exclude a region 930 in which the corresponding deformation curvature exists, by taking a deformation location, a deformation direction, and a deformation intensity into account.

Alternatively, when the activated region 920 is bent at a certain curvature, the processor 130 may adjust the activated region 920 according to the largest deformation curvature in the activated region 920. For example, as shown in FIG. 9B, when the largest deformation curvature in the activated region 950 is equal to or greater than "10 degrees", the processor 130 may reduce the activated region 950 based on the center of a gazing point 940 (here, the reduced activated region is shown as a bold hatched region).

Alternatively, the processor 130 may adjust the activated region 920 based on a viewing angle of a user.

Figure 10:
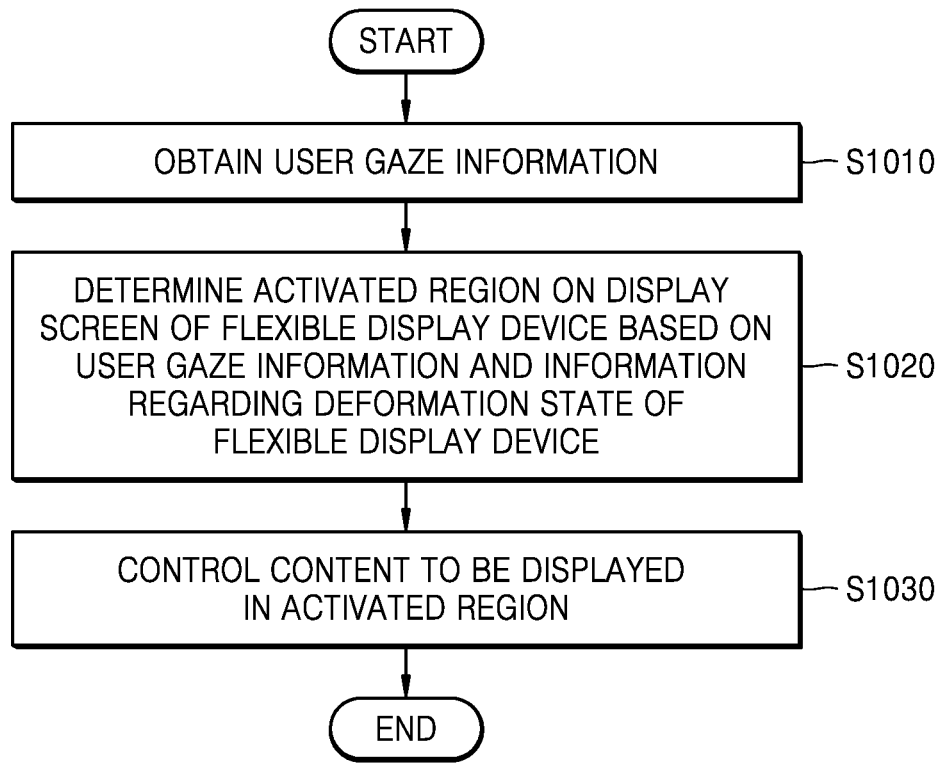
FIG. 10 is a flowchart for describing a method whereby a flexible display device determines an activated region to display content, according to an exemplary embodiment.

FIG. 10 is a flowchart for describing a method whereby a flexible display device determines an activated region to display content according to an embodiment.

Referring to FIG. 10, in operation S1010, the sensor 120 may obtain user gaze information regarding a user. Here, the user gaze information may include pupil recognition information and information regarding a gaze direction regarding the user. The sensor 120 may obtain distance information regarding a distance from a pupil of a user to the flexible display 110.

Furthermore, the sensor 120 may sense a curvature in a deformation state of the flexible display device 10 or the flexible display 110. Alternatively, the sensor 120 may sense a degree of folding or rolling of the flexible display device 10 or the flexible display 110, depending on a type of flexible display in the flexible display device 10 or the flexible display 110.

According to an embodiment, the sensor 120 may obtain information regarding a deformation location (a coordinate value and a deformation line), a deformation direction, a deformation angle, a deformation curvature, deformation intensity, the number of deformations, etc.

In operation S1020, the processor 130 may determine an activated region on a display screen of the flexible display device 10 based on user gaze information and information regarding a deformation state of the flexible display device 10.

According to an embodiment, the processor 130 may extract a gazing point of a user based on information regarding a gaze direction of the user. Here, the gazing point may be a certain region on the display screen of the flexible display device 10, the region gazed by a user with both eyes.

According to an embodiment, the processor 130 may determine an activated region to locations that are a predetermined distance apart from a gazing point in four directions.

According to an embodiment, the processor 130 may determine whether a deformation curvature greater than or equal to a critical curvature exists in a determined activated region and adjust the activated region. When it is determined that a curvature equal to or greater than the critical value exists, the processor 130 may adjust the activated region by taking a deformation location, a deformation direction, and deformation intensity into account. Alternatively, the processor 130 may adjust the activated region according to the largest deformation curvature in the activated region. For example, when the largest deformation curvature in the activated region is equal to or greater than of "10 degrees", the processor 130 may reduce the activated region based on a gazing point. Alternatively, the processor 130 may adjust the activated region based on a viewing angle of a user.

In operation S1030, the processor 130 may control content to be displayed in the activated region. The processor 130 may control the flexible display 110, such pixels corresponding to the activated region are activated (or turned on) and control pixels corresponding to the remaining regions to be deactivated (or turned off). Here, deactivation of pixels may mean that the pixels are processed as margins having a color, such as black, white, etc., when content is generated.

Figure 11:
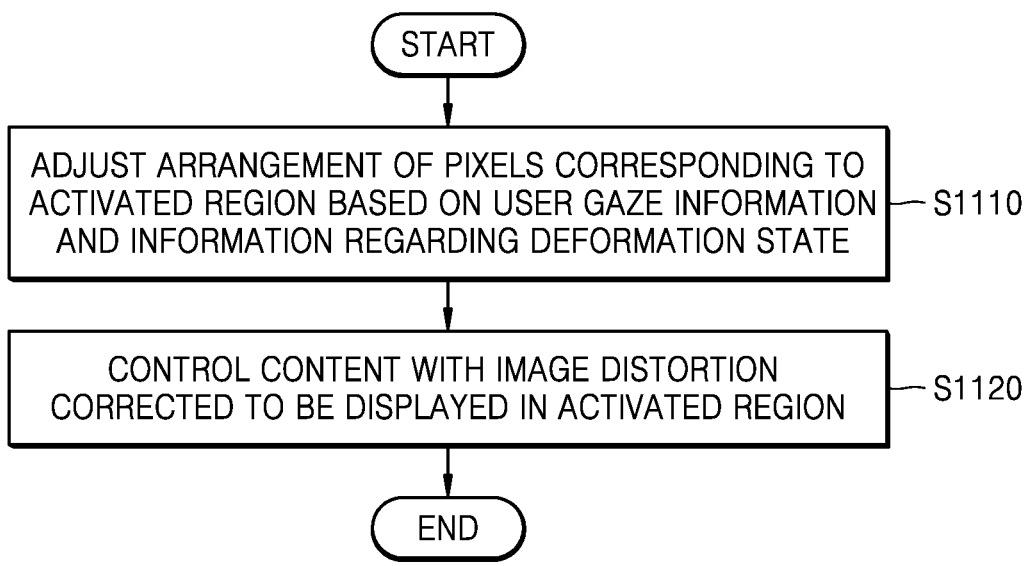
FIG. 11 is a flowchart for describing a method whereby a processor corrects an image distortion, according to an exemplary embodiment.

FIG. 11 is a flowchart for describing a method whereby a processor corrects an image distortion according to an embodiment.

Referring to FIG. 11, in operation S1110, the processor 130 may adjust an arrangement of pixels corresponding to an activated region, based on user gaze information and information regarding a deformation state.

When content is displayed as-is in a state where the flexible display device 10 is deformed, the content may be displayed in a distorted manner. To correct such a display distortion, the processor 130 may adjust an arrangement of pixels corresponding to an activated region, based on a deformation state of the flexible display device 10 or the flexible display 110.

Figure 12:
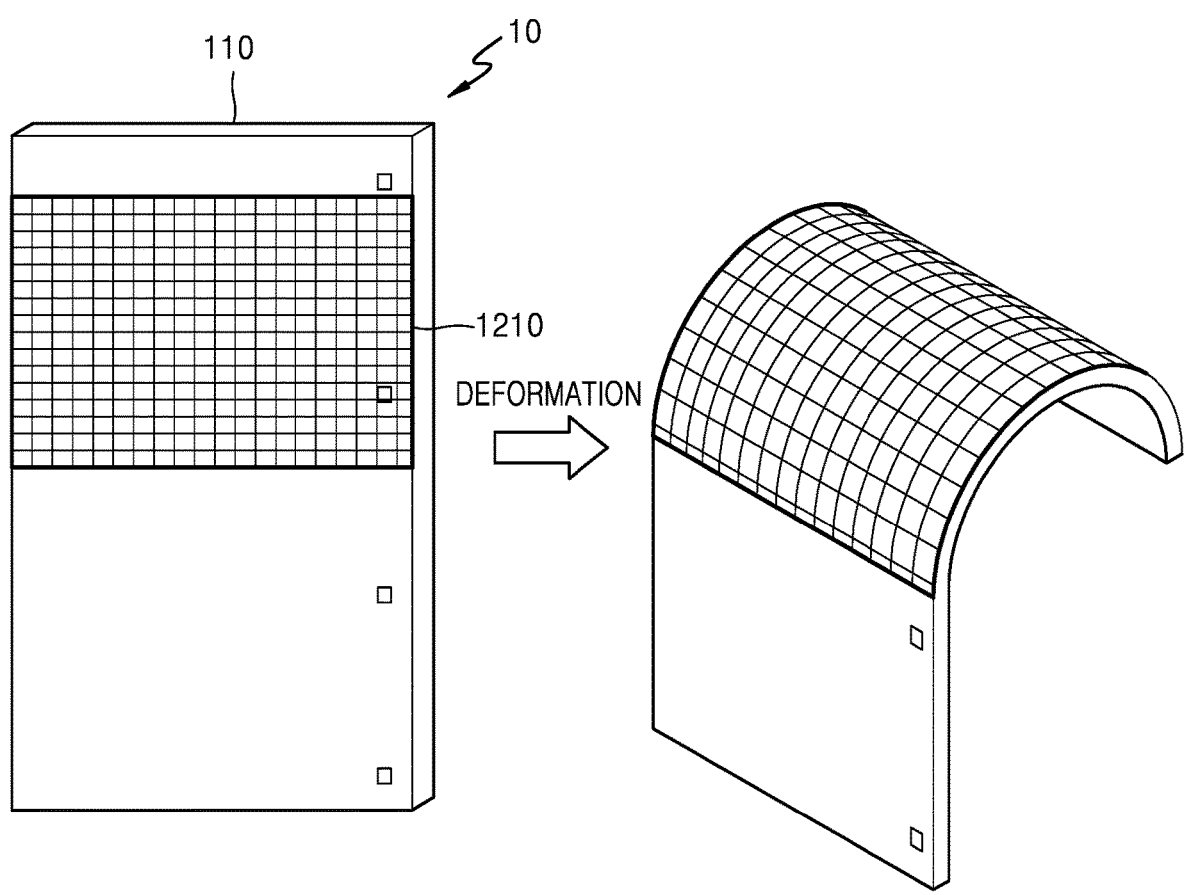
FIG. 12 is a diagram showing an example of pixels corresponding to an activated region.

FIG. 12 is a diagram showing an example in which a distortion of pixels occurs due to a deformation of a flexible display. Referring to FIG. 12, the processor 130 may generate content including pixels of a predetermined size and display the generated content on the flexible display 110. However, when the flexible display 110 is deformed by an external force as shown in FIG. 12, pixels of the content corresponding to a deformation location may be distorted due to the deformation of the flexible display 110.

Figure 13:
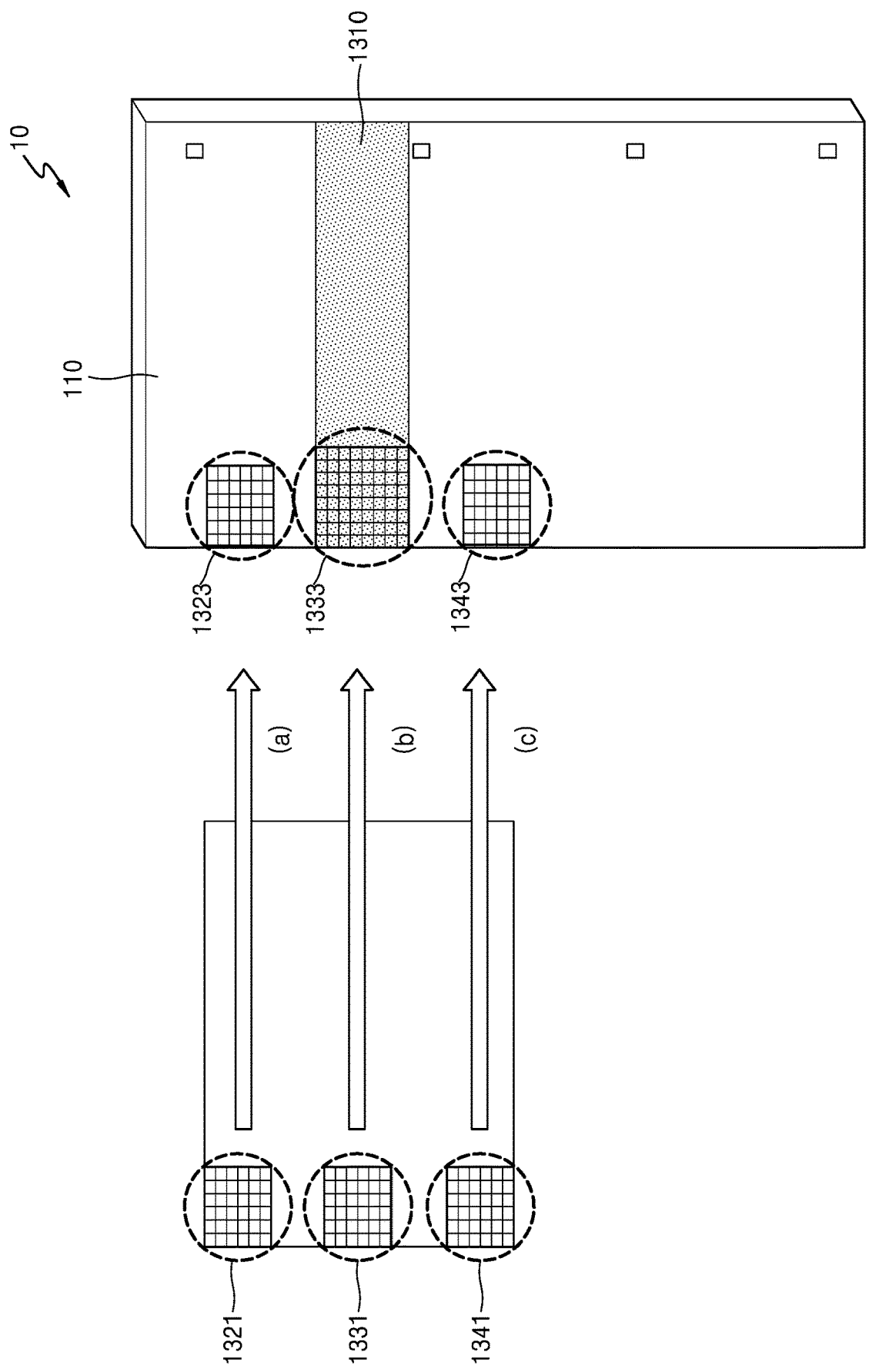
FIG. 13 is a diagram showing an example of adjusting pixels corresponding to an activated region.

FIG. 13 is a diagram showing an example of adjusting pixels corresponding to an activated region. Referring to FIG. 13, when it is assumed that a displayable pixel array of the flexible display 110 and a pixel array of content have a same matrix structure, the content may be displayed, such that each of pixels of the content correspond to pixels of the flexible display 110 on the one-on-one basis. Therefore, as shown in FIG. 12, when the flexible display 110 is not deformed, no display distortion occurs, and thus the processor 130 may map the pixels of the content to the pixels of the flexible display 110 on the one-on-one basis.

However, as shown in FIG. 12, when the flexible display 110 is in a deformation state, the processor 130 may adjust a ratio of pixels of the flexible display 110 assigned to pixels of the content to correct the display distortion.

For example, referring to FIG. 13, the processor 130 may adjust a ratio of pixel assignment, such that pixels 1323 and 1343 of the flexible display 110 are assigned to pixels 1321 and 1341 of content corresponding to a region in which the flexible display 110 is not deformed and more pixels 1333 of the flexible display 110 are assigned to pixels 1331 of the flexible display 110 corresponding to a deformation location 1310 as shown in FIG. 13. In other words, on pixels of the flexible display 110, a portion of content corresponding to the deformation location 1310 of the flexible display 110 may be displayed being expanded.

On the contrary, the processor 130 may adjust a ratio of pixel assignment, such that pixels of content corresponding to the remaining region other than the deformation location 1310 are allocated to fewer pixels of the flexible display 110.

Referring back to FIG. 11, in operation S1120, the processor 130 may control content with corrected image distortion to be displayed in the activated region.

Figure 14:
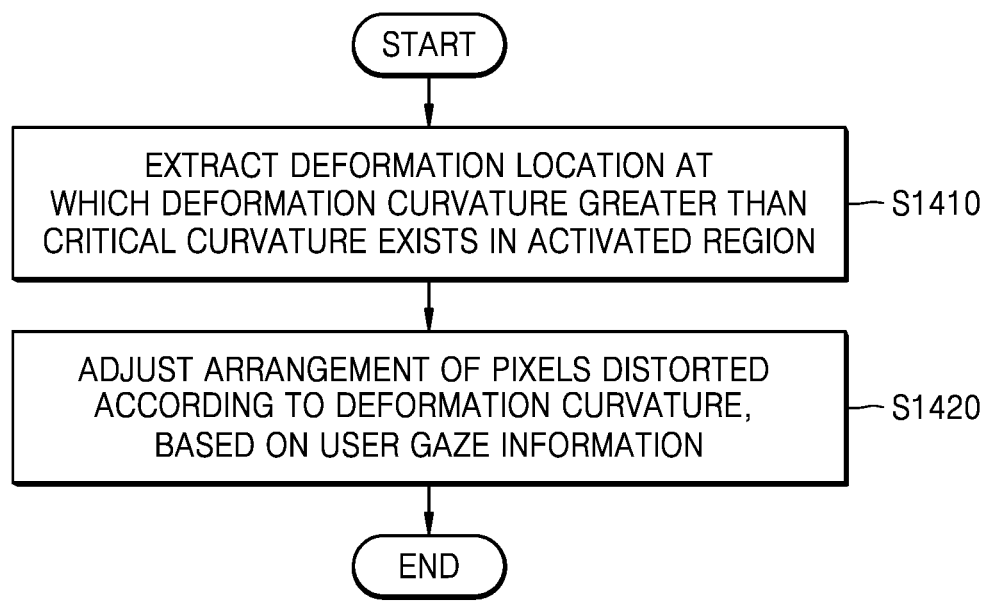
FIG. 14 is a flowchart for describing a method whereby a processor adjusts content displayed in a distorted manner according to a deformation state of a flexible display device, according to an exemplary embodiment.

FIG. 14 is a flowchart for describing a method whereby a processor adjusts content displayed in a distorted manner according to a deformation state of a flexible display device according to an embodiment.

Referring to FIG. 14, in operation S1410, the processor 130 may extract a deformation location including a deformation curvature (or a deformation angle) greater than a critical value in an activated region based on information regarding a deformation state of the flexible display device 10 provided from the sensor 120. At this time, the information regarding a deformation state may include information regarding, for example, a deformation curvature, a deformation angle, a deformation location, deformation intensity, etc.

When a deformation curvature (or a deformation angle) is large, it may be difficult for a user to recognize content. Therefore, in operation S1420, the processor 130 may adjust a type of content or a shape of an activated region corresponding to the extracted deformation location. For example, the processor 130 may adjust a shape of an object corresponding to extracted deformation location from among objects included in content. Alternatively, the processor 130 may adjust a shape of an activated region corresponding to extracted deformation location.

Figure 15A:
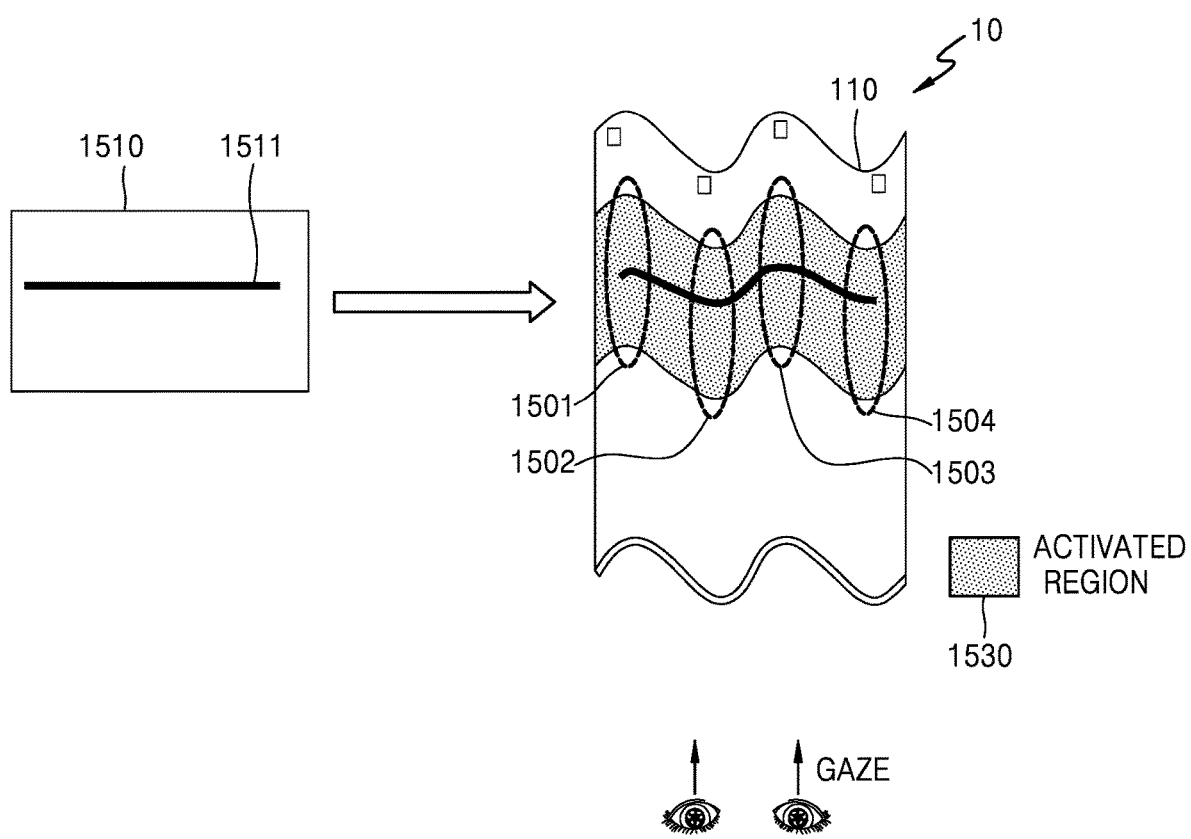
FIGS. 15A through 15C are diagram showing an example in which a processor adjusts content displayed in a distorted manner, according to a deformation state of a flexible display device.
Figure 15B:
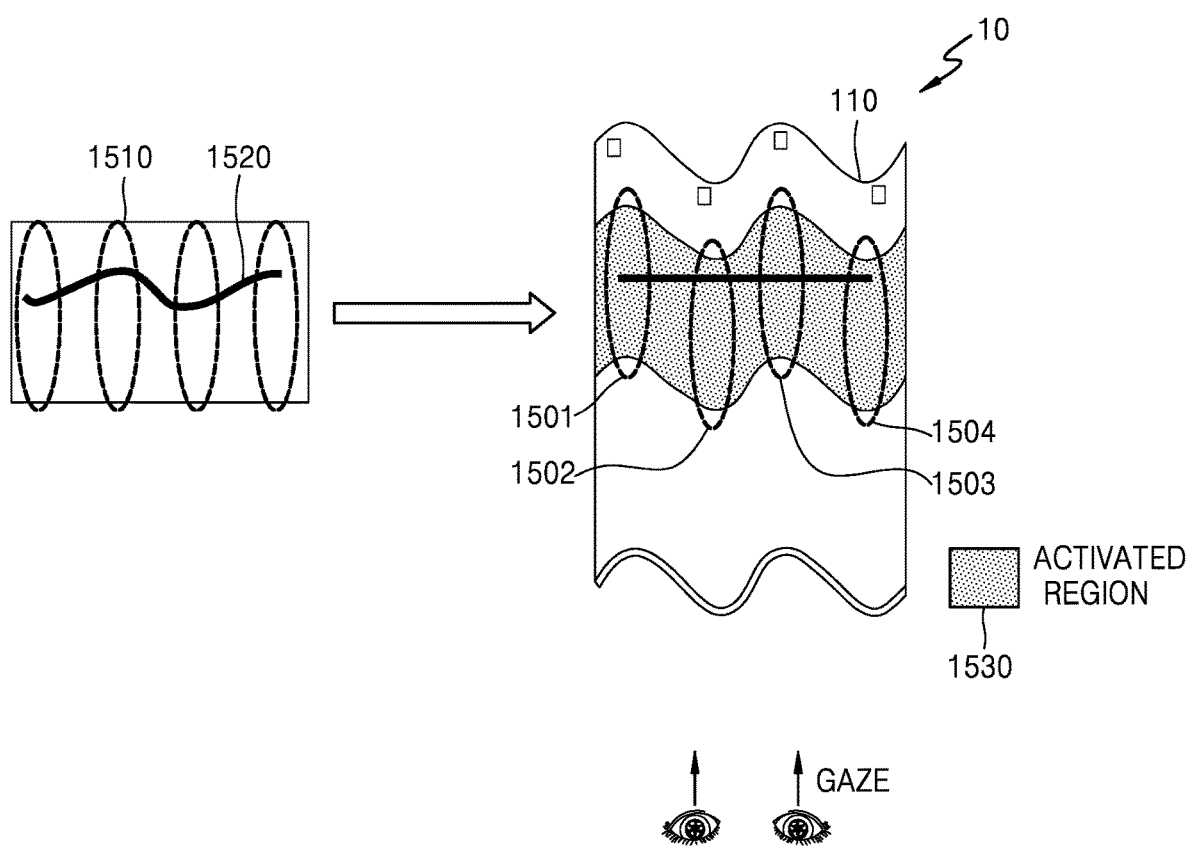
Figure 15C:
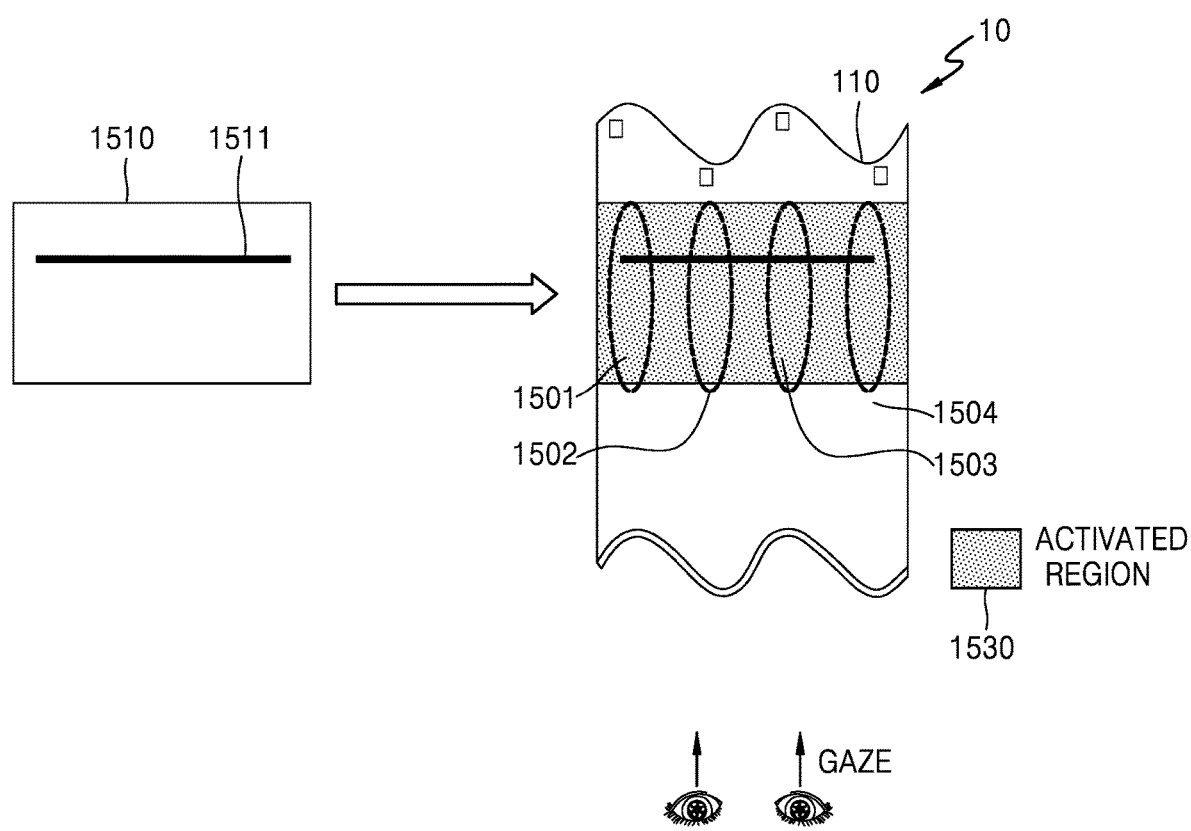

FIGS. 15A through 15C are diagrams showing an example in which a processor adjusts content displayed in a distorted manner, according to a deformation state of a flexible display device.

Referring to FIG. 15A, the flexible display device 10 may be bent into an arbitrary shape. Therefore, even when content 1510 includes a straight-line type object 1511, due to a deformation state of the flexible display device 10, the straight-line type object 1511 may be displayed to a user as a curved line. Therefore, in order to show the straight-line type object 1511 included in the content 1510 as-is to a user, the processor 130 may adjust a shape of the content 1510 or an activated region.

For example, the processor 130 may extract first through fourth deformation locations 1501 through 1507 where deformation curvatures equal to or greater than "45 degrees" are located in the activated region 1530. The processor 130 may adjust the straight-line type object 1511 corresponding to the first through fourth deformation location 1501 through 1504 in the content 1510 into a curved-line type object 1520, Therefore, the curved-line type object 1520 displayed in the flexible display 110 may be viewed by a user as a straight line.

Alternatively, the processor 130 may adjust the shape of the activated region 1530, instead of adjusting the shape of an object contained in the content 1510. As shown in FIG. 15C, the processor 130 may adjust the shape of the activated region 1530, such that the straight-line type object 1511 is displayed as a straight line on the flexible display 110.

Figure 16:
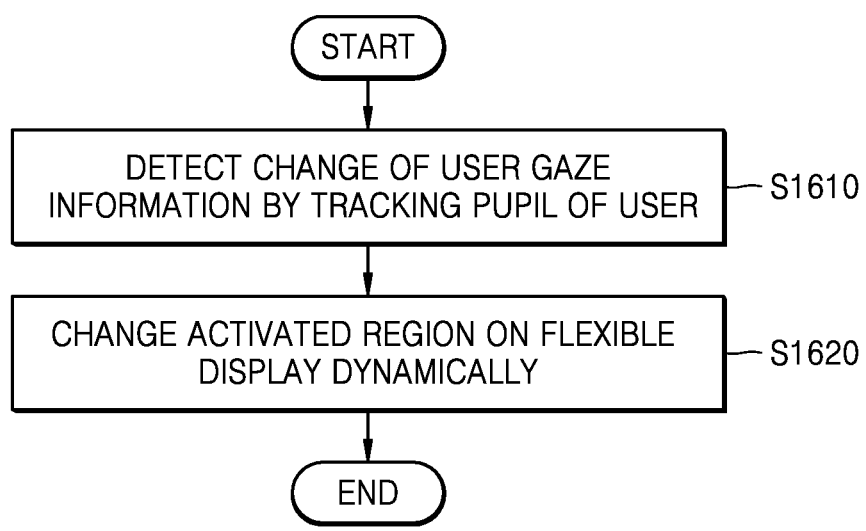
FIG. 16 is a flowchart for describing a method whereby a processor changes an activated region, according to an embodiment dynamically.

FIG. 16 is a flowchart for describing a method whereby a processor dynamically changes an activated region according to an embodiment.

Referring to FIG. 16, in operation S1610, the sensor 120 may sense movement of a pupil of a user by tracking the pupil of the user. The user may use the flexible display device 10 in a stationary manner. However, in many cases, the user may use the flexible display device 10 on the move. In this case, a gazing point viewed by the user may continuously change. Therefore, according to an embodiment, the sensor 120 may provide the processor 130 with information regarding changes of a location of a pupil of a user and a gaze direction of the user by tracking the pupil of the user.

In operation S1620, the processor 130 may dynamically change an activated region in the flexible display 110. The processor 130 may update a gazing point of a user, and then determine an activated region based on the updated gazing point. Furthermore, the processor 130 may adjust an activated region based on whether a deformation curvature exists in a changed activated region. Alternatively, the processor 130 may adjust the size of a changed activated region by taking a viewing angle of a user into account.

Figure 17:
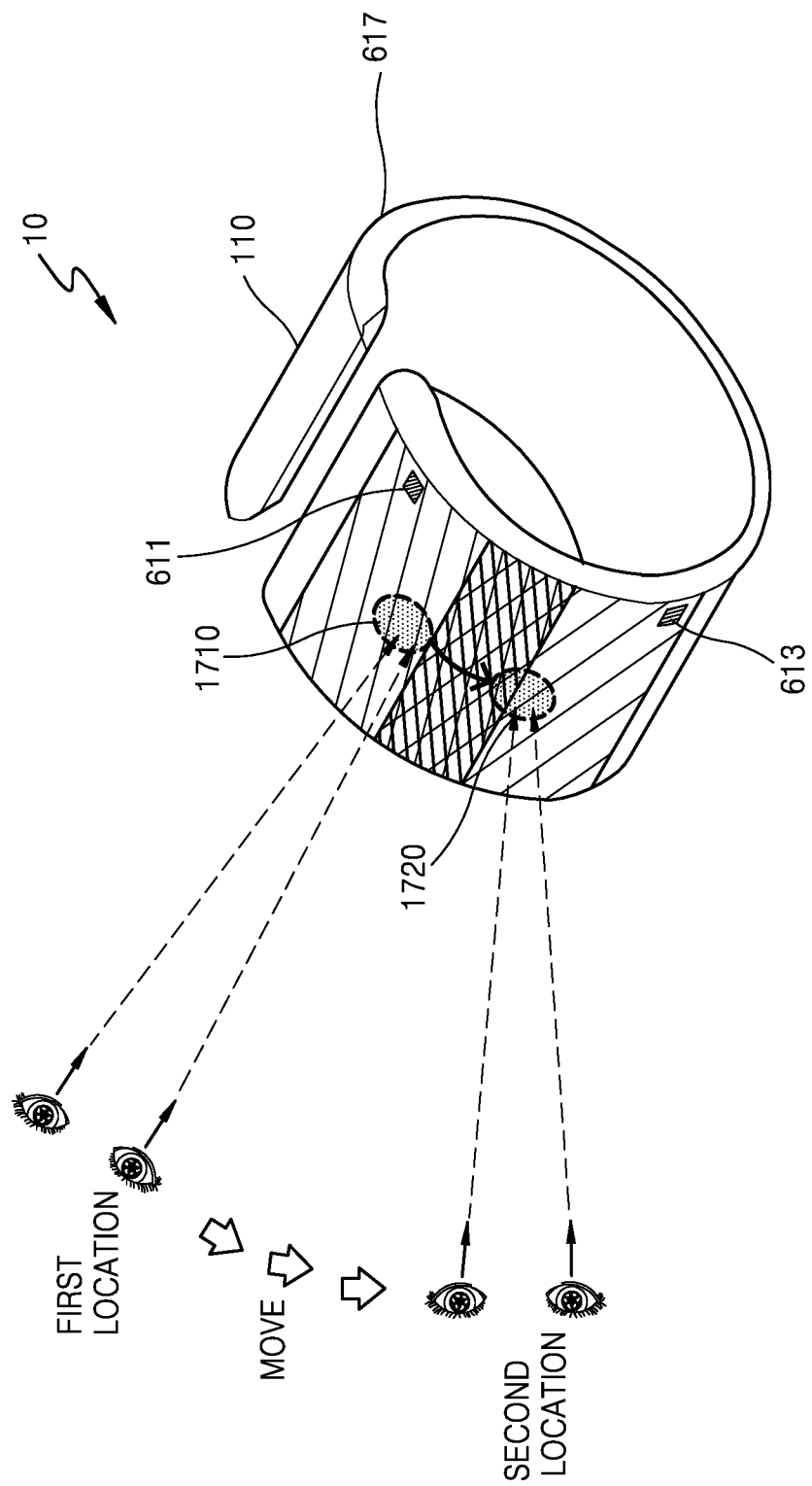
FIG. 17 is a diagram showing an example in which a processor changes an activated region dynamically.

FIG. 17 is a diagram showing an example that a processor dynamically changes an activated region.

Referring to FIG. 17, as a pupil of a user moves from a first location to a second location, the processor 130 may change a first gazing point 1710 corresponding to the first location to a second gazing point 1720 corresponding to the second location. At this time, as the pupil of the user moves from the first location to the second location, the sensor 120 switches the second gaze detecting sensor 613 to the activated state, thereby tracking the user's pupil and providing information regarding a gaze direction of the user to the processor 130.

According to an embodiment, the processor 130 may re-determine an activated region as a gazing point is changed. Furthermore, the processor 130 may adjust an activated region based on information regarding a deformation state of the flexible display 110 in the re-determined activated region.

Figure 18:
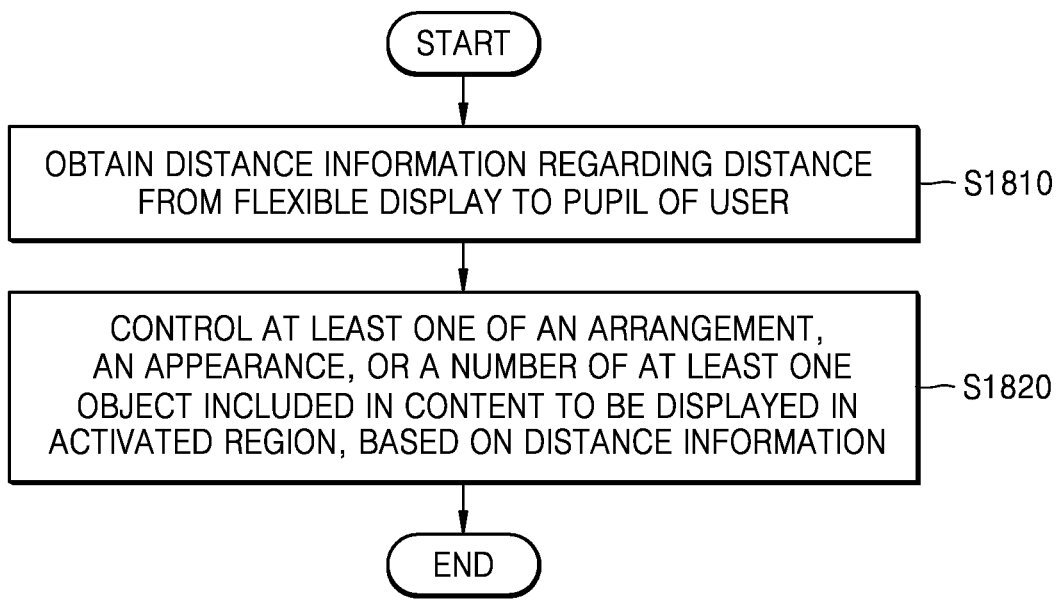
FIG. 18 is a flowchart for describing a method whereby a processor controls content to be displayed.

FIG. 18 is a flowchart for describing a method whereby a processor controls content to be displayed.

Referring to FIG. 18, in operation S1810, the sensor 120 may obtain distance information regarding a distance from the flexible display device 10 to a user's pupil.

For example, the sensor 120 may obtain distance information regarding a distance from the flexible display device 10 to a user's pupil by analyzing an image captured by an gaze detecting sensor. Alternatively, the sensor 120 may obtain distance information regarding a distance from the flexible display device 10 to the user's pupil according to a time period elapsed for an infrared ray emitted from an gaze detecting sensor to return. Furthermore, the sensor 120 may provide obtained distance information to the processor 130.

In operation S1820, the processor 130 may control at least one of an arrangement, an appearance, and the number of at least one object included in content to be displayed in the activated region, based on distance information regarding a distance to a user provided from the sensor 120. Here, the content may include, for example, a notification message, an application program execution screen, etc.

According to an embodiment, when content includes a plurality of objects, the processor 130 may change an arrangement of the objects according to distances to a user. For example, the processor 130 may assign priorities to a plurality of objects and arrange objects having high priorities at locations close to a gazing point. The processor 130 may assign the highest priority to, for example, an image indicating a type of content (e.g., a notification image, an application program logo, etc.) and assign the lowest priority to an image indicating detailed information regarding content (e.g., notification content, information regarding an application program execution screen, etc.). Therefore, when a gazing point of a user is changed, an arrangement of content may be dynamically changed.

Furthermore, the processor 130 may change an appearance of at least one object. For example, the processor 130 may display same information as a text when a distance to a user is within a critical distance or as an image when the distance to a user is equal to or greater than the critical distance. Alternatively, the processor 130 may change an amount of information to provide according to distances to a user.

Furthermore, when content includes a plurality of objects, the processor 130 may change the number of objects. For example, the processor 130 may assign priorities to a plurality of objects and, when a distance to a user is greater than a critical distance, only an object with the highest priority may be displayed in an activated region. On the contrary, when the distance to the user is smaller than the critical distance, all of the plurality of objects may be displayed.

Although it has been described above that the processor 130 displays content differently based on distance information regarding a distance from the flexible display device 10 to a user, the present disclosure is not limited thereto. According to an embodiment, the processor 130 may display content differently according to a size of an activated region. For example, the processor 130 may change at least one of an arrangement, an appearance, and the number of objects included in content according to a size of an activated region. Alternatively, the processor 130 may change at least one of an arrangement, an appearance, and the number of objects included in content according to a shape of an activated region.

Figure 19:
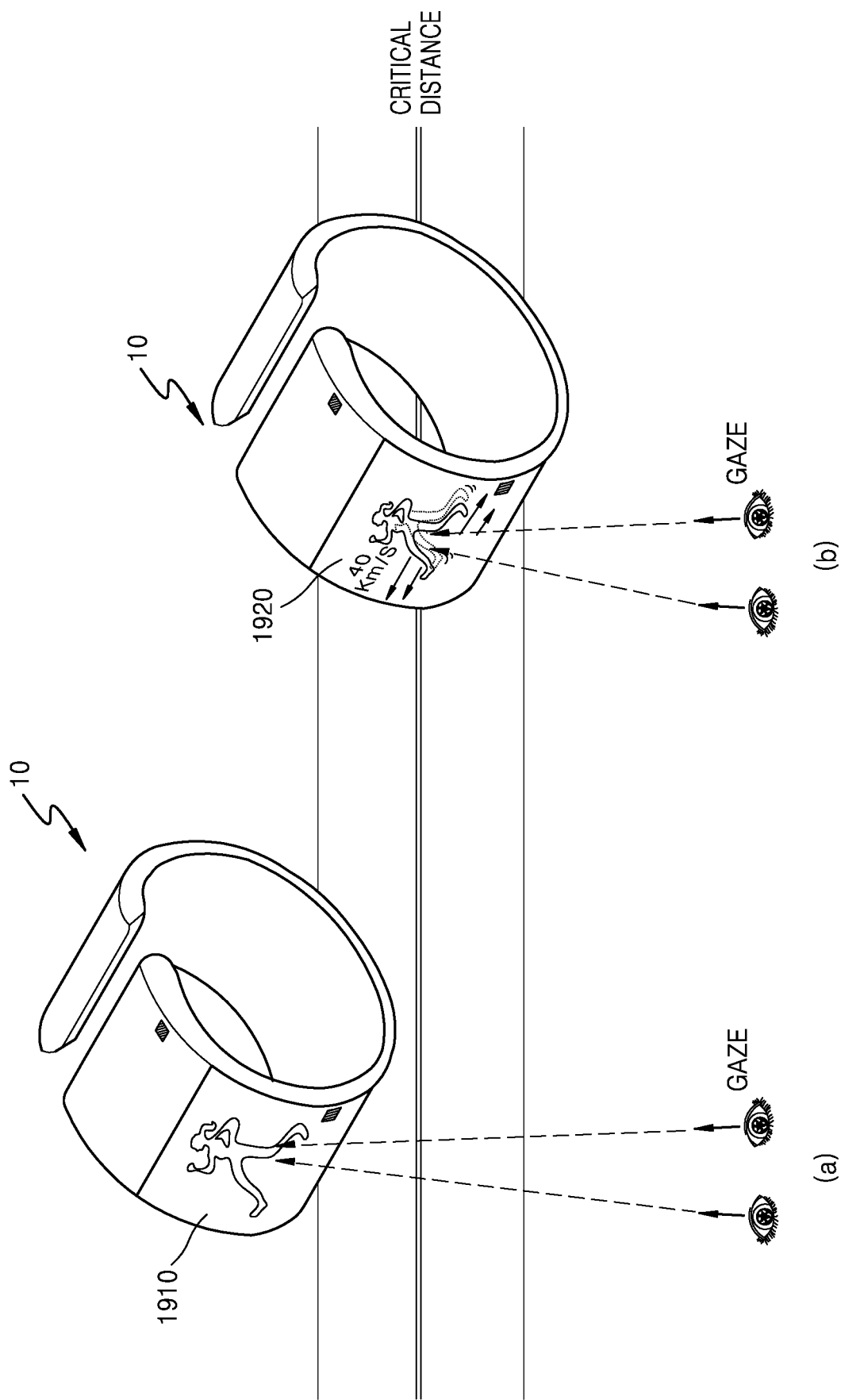
FIGS. 19A and 19B are diagrams showing an example in which a processor controls an appearance of an object included in content to be displayed in an activated region.

FIGS. 19A and 19B are diagrams showing an example that a processor controls an appearance of an object included in content to be displayed in an activated region.

Referring to FIGS. 19A and 19B, the flexible display device 10 may be a wristband-type wearable device. When the user views the flexible display device 10 in which an application is executed during an exercise, the processor 130 may change an appearance of an object included in an execution image of a running application according to a distance to the user.

For example, as shown in FIG. 19A, when a distance to a user is greater than a critical distance, the processor 130 may generate a running application execution screen including a still image 1910 indicating that a running application is being execute. On the contrary, when the distance to the user is smaller than the critical distance as shown in FIG. 19B, the processor 130 may generate a running application execution screen including a moving picture 1920 showing that a character is running. Furthermore, the processor 130 may control the number of objects included in a running application execution screen, such that information regarding a current speed of the user is also displayed.

Figure 20:
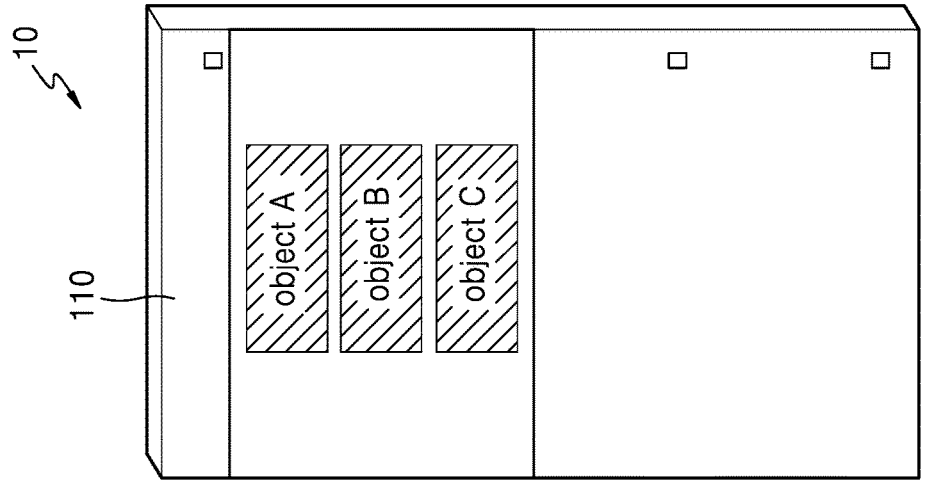
FIGS. 20A through 20C are diagrams showing an example in which a processor controls the number of a plurality of objects included in content.
Figure 20:
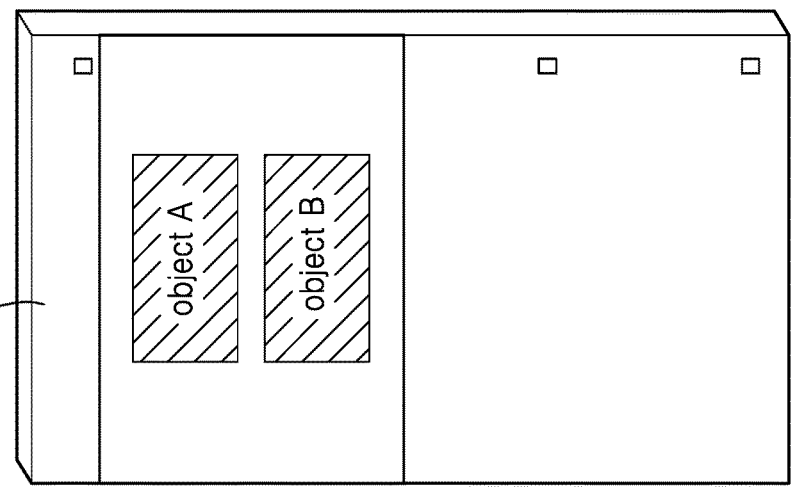
Figure 20:
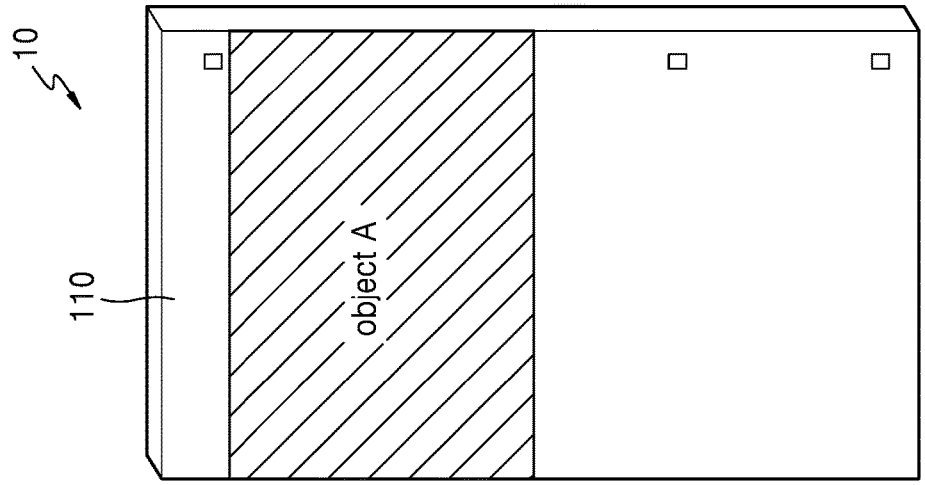

FIGS. 20A through 20C are diagrams showing an example that a processor controls the number of a plurality of objects included in content.

Referring to FIGS. 20A through 20C, the processor 130 may control the number of a plurality of objects included in content according to distance information regarding a distance from the flexible display device 10 to a user. At this time, the processor 130 may generate content by using priorities assigned to the plurality of objects included in the content.

When content includes three objects, the processor 130 may compare distance information regarding a distance to a user provided from the sensor 120 with a first critical distance (e.g., 40 cm) and a second critical distance (e.g., 20 cm) and control the number of objects included in the content. As in FIG. 20A, when the distance information regarding a distance to the user is greater than the first critical distance, the processor 130 may generate content including one object with the highest priority. Furthermore, as in FIG. 20B, when the distance information regarding a distance to the user is greater than the first critical distance and smaller than the second critical distance, the processor 130 may generate content including the two objects according to priorities. Furthermore, as in FIG. 20C, when the distance information regarding a distance to the user is smaller than the second critical distance, the processor 130 may generate content including all objects.

Figure 21:
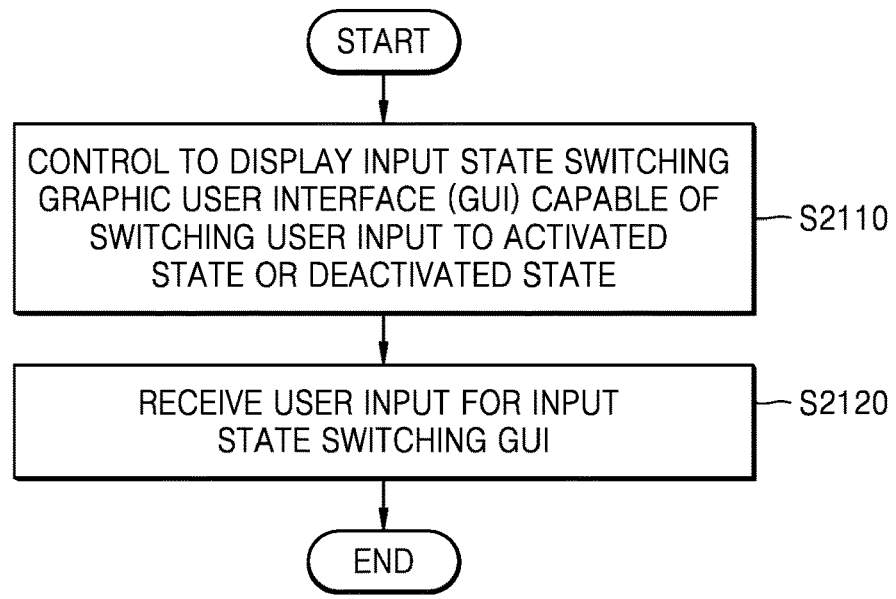
FIG. 21 is a flowchart for describing a method whereby a processor deactivates or activates a user input of a flexible display device, according to an exemplary embodiment.

FIG. 21 is a flowchart for describing a method whereby a processor deactivates or activates a user input of a flexible display device according to an embodiment.

Referring to FIG. 21, in operation S2110, the processor 130 may control an input state switching graphic user interface (GUI) capable of switching a user input to an deactivated state or an activated state. Here, switching a user input to the deactivated state may mean that the processor 130 does not perform a calculating operation according to a user input received through the user input interface 310. Alternatively, switching a user input to the deactivated state may mean that the user input interface 310 does not receive a user input. Switching a user input to the activated state may also mean that the processor 130 resumes a calculating operation according to a user input received through the user input interface 310.

According to an embodiment, the processor 130 may control to display an input state switching GUI regardless of a currently executed application program. For example, the processor 130 may control to display an input state switching GUI together with an execution screen of a running application. Therefore, a user may prevent an unintended operation of the flexible display device 10 due to an erroneous user input during movement by deactivating a user input.

Meanwhile, the input state switching GUI may be in various forms, such as an icon, an image, a text, etc.

In operation S2120, the user input interface 310 may receive a user input for an input state transition GUI. According to the user input for the input state transition GUI, the processor 130 may switch a user input to the deactivated state when a user input is activated. Here, even when a user input is switched to the deactivated state, a user input for the input state transition GUI may be in the activated state.

Figure 22:
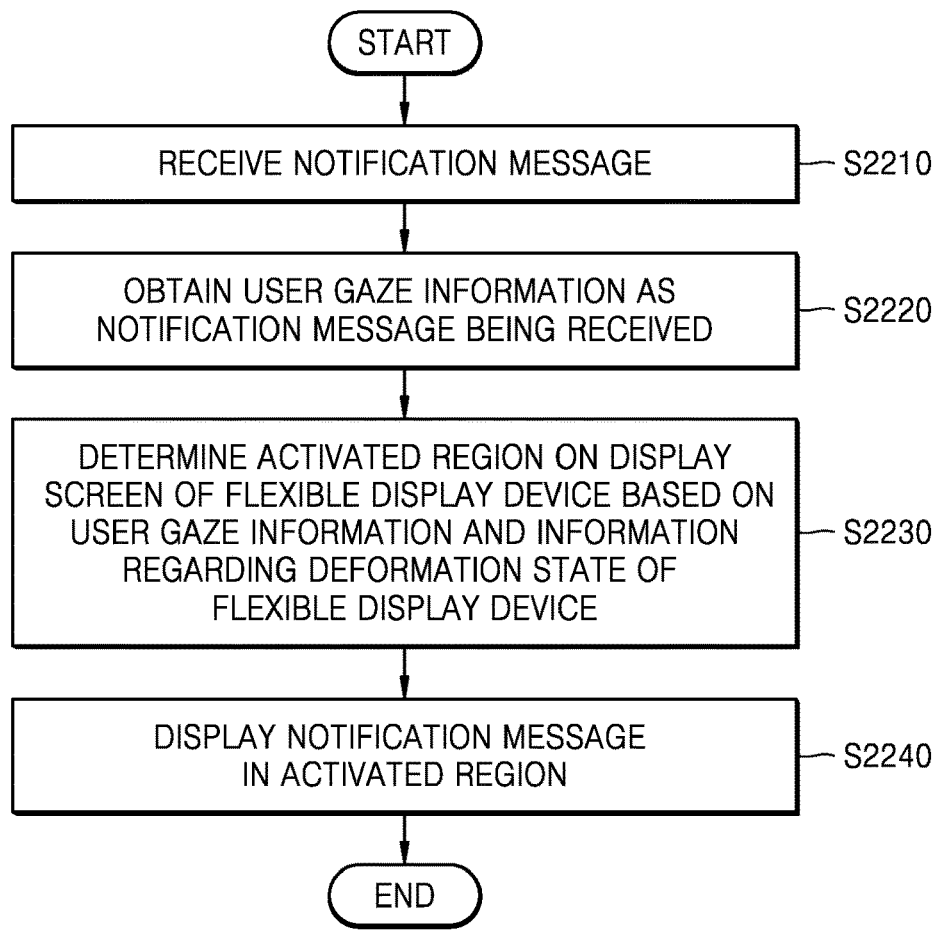
FIG. 22 is a flowchart for describing a method whereby a flexible display device displays a notification message, according to an exemplary embodiment.

FIG. 22 is a flowchart for describing a method whereby a flexible display device displays a notification message according to an embodiment.

Referring to FIG. 22, in operation S2210, the flexible display device 10 may receive a notification message. Here, the notification message may include not only a text message, a voice call notification, a social network service (SNS) message, and a chatting message, but also a message regarding an event occurring in the flexible display device 10, an alarm message, and a schedule notification message, etc.

In operation S2220, the flexible display device 10 may obtain user gaze information regarding a user as the notification message is received. Here, the user gaze information regarding a user may include user pupil recognition information, information regarding a gaze direction of the user, etc.

In operation S2230, the flexible display device 10 may determine an activated region on the display screen of the flexible display device 10 based on user gaze information and curvature information regarding the flexible display device 10. The flexible display device 10 may extract a gazing point of the user on the display screen of the flexible display device 10 based on the user gaze information. The flexible display device 10 may adjust the activated region based on the curvature information regarding the flexible display device 10 after the activated region is determined based on the extracted gazing point. For example, when a curvature equal to or greater than a critical curvature exists in the determined activated region, the flexible display device 10 may reduce the activated region to a region that does not include the corresponding curvature. Alternatively, the flexible display device 10 may adjust the activated region by taking a viewing angle of the user into account.

In operation S2240, the flexible display device 10 may display the notification message in the activated region.

As described above, the flexible display device 10 according to an embodiment may dynamically change a location at which content is displayed and a layout of the content according to a deformation state of the flexible display device 10 and user gaze information, thereby improving visibility of the content. Furthermore, by correcting a display distortion caused by bending or folding of the flexible display device 10, readability of the user regarding content may be improved regardless of a deformation state of the flexible display device 10.

Meanwhile, the above-described method may be composed as a program that can be executed by a computer and may be implemented in a general-purpose digital computer that operates the program by using a computer-readable recording medium. In addition, the structure of data used in the above-described method may be recorded on a computer-readable recording medium through various means. The computer-readable recording medium includes a storage medium, such as a magnetic storage medium (e.g., a ROM, a floppy disk, a hard disk, etc.) and an optical reading medium (e.g., a CD-ROM, a DVD, etc.)

It will be understood by those skilled in the art that various changes in form and details may be made therein without departing from the spirit and scope of the present disclosure as defined by the appended claims. The preferred embodiments should be considered in descriptive sense only and not for purposes of limitation. Therefore, the scope of the present disclosure is defined not by the detailed description of the present disclosure but by the appended claims, and all differences within the scope will be construed as being included in the present disclosure.

The invention claimed is:

1. A flexible display device comprising:
    a flexible display;
    at least one sensor configured to:
        obtain user gaze information and curvature information regarding the flexible display, and
        obtain distance information regarding a distance from the flexible display device to a pupil of a user; and
    at least one processor configured to:
        determine an activated region for displaying content and a non-activated region in which content is not displayed on the flexible display based on the user gaze information,
        adjust the activated region based on the curvature information when a curvature in the activated region is greater than a critical curvature,
        control content to be displayed in the activated region, and
        control at least one of an arrangement, an appearance, or at least one of a number of objects included in the content based on the distance information.

2. The flexible display device of claim 1, wherein the at least one processor is further configured to:
    extract a gazing point of the user based on the user gaze information, and
    determine the activated region based on the gazing point.

3. The flexible display device of claim 1, wherein the at least one processor is further configured to generate the content with image distortion corrected by adjusting an arrangement of pixels corresponding to the activated region based on the user gaze information and the curvature information.

4. The flexible display device of claim 3, wherein the at least one processor is further configured to, as the user gaze information obtained by the least one sensor changes, control the activated region on the flexible display so as to be dynamically changed.

5. The flexible display device of claim 1, wherein the at least one processor is further configured to, when the content comprises a plurality of objects, as the distance information obtained by the at least one sensor changes, control at least one of an arrangement, an appearance, or a number of the plurality of objects to be changed.

6. The flexible display device of claim 1, wherein the at least one sensor comprises a plurality of gaze-detecting sensors arranged at a predetermined interval to obtain the user gaze information.

7. A method by which a flexible display device displays content, the method comprising:
    obtaining user gaze information and curvature information regarding the flexible display;
    obtaining distance information regarding a distance from the flexible display device to a pupil of a user;
    determining an activated region for displaying content and a non-activated region in which content is not displayed on the flexible display based on the user gaze information;
    adjusting the activated region based on the curvature information when a curvature in the activated region is greater than a critical curvature;
    controlling content to be displayed in the determined activated region; and
    controlling at least one of an arrangement, an appearance, or at least one of a number of objects included in the content based on the distance information.

8. The method of claim 7, wherein the determining of the activated region and the non-activated region further comprises:
    extracting a gazing point of the user based on the user gaze information, and
    determining the activated region based on the gazing point.

9. The method of claim 7, further comprising generating the content with image distortion corrected by adjusting an arrangement of pixels corresponding to the activated region based on the user gaze information and the curvature information.

10. The method of claim 9, further comprising, when the user gaze information changes, controlling the activated region to be dynamically changed.

11. A non-transitory computer-readable recording medium having a computer readable program stored therein,
wherein the computer readable program, when executed on a computing device, causes the computing device to:
obtain user gaze information and curvature information regarding a flexible display,
obtain distance information regarding a distance from a flexible display device to a pupil of a user,
determine an activated region for displaying content and a non-activated region in which content is not displayed on the flexible display based on the user gaze information,
adjust the activated region based on the curvature information when a curvature in the activated region is greater than a critical curvature,
control content to be displayed in the determined activated region, and
control at least one of an arrangement, an appearance, or at least one of a number of objects included in the content based on the distance information.

* * * * *